US011943610B2

(12) United States Patent
Dai et al.

(10) Patent No.: US 11,943,610 B2
(45) Date of Patent: Mar. 26, 2024

(54) SECURITY ENHANCEMENTS WITH A RECONFIGURABLE INTELLIGENT SURFACE

(71) Applicant: QUALCOMM Incorporated, San Diego, CA (US)

(72) Inventors: Yucheng Dai, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 397 days.

(21) Appl. No.: 17/447,985

(22) Filed: Sep. 17, 2021

(65) Prior Publication Data

US 2023/0101393 A1    Mar. 30, 2023

(51) Int. Cl.
*H04W 12/0431* (2021.01)
*H04W 12/06* (2021.01)
*H04W 24/08* (2009.01)
*H04W 72/23* (2023.01)
*H04W 76/10* (2018.01)

(52) U.S. Cl.
CPC ....... *H04W 12/0431* (2021.01); *H04W 12/06* (2013.01); *H04W 24/08* (2013.01); *H04W 72/23* (2023.01); *H04W 76/10* (2018.02)

(58) Field of Classification Search
CPC ............. H04W 12/0431; H04W 12/06; H04W 12/069; H04W 72/23; H04W 72/20; H04W 72/29; H04W 12/043
See application file for complete search history.

(56) References Cited

U.S. PATENT DOCUMENTS

| 2022/0059943 | A1* | 2/2022 | Saab | H04B 7/0617 |
| 2022/0149888 | A1* | 5/2022 | Tsui | H04B 1/525 |
| 2022/0321198 | A1* | 10/2022 | Devoti | H04W 16/28 |
| 2022/0407222 | A1* | 12/2022 | Zhu | H04B 7/04013 |

* cited by examiner

*Primary Examiner* — Olugbenga O Idowu
(74) *Attorney, Agent, or Firm* — Harrity & Harrity, LLP

(57) ABSTRACT

Various aspects of the present disclosure generally relate to wireless communication. In some aspects, a user equipment (UE) may receive a first signal associated with a downlink control channel, wherein the first signal uses a modulation signature that identifies a first security key associated with a reconfigurable intelligent surface (RIS), and wherein the first signal includes a second security key. The UE may receive a second signal associated with a downlink shared channel, wherein the second signal includes a third security key, and wherein the second signal is authenticated by the UE based at least in part on the first security key, the second security key, and the third security key. Numerous other aspects are described.

30 Claims, 13 Drawing Sheets

SECURITY ENHANCEMENTS WITH A RECONFIGURABLE INTELLIGENT SURFACE

FIELD OF THE DISCLOSURE

Aspects of the present disclosure generally relate to wireless communication and to techniques and apparatuses for security enhancements with a reconfigurable intelligent surface (RIS).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a first signal associated with a downlink control channel, wherein the first signal uses a modulation signature that identifies a first security key associated with a reconfigurable intelligent surface (RIS), and wherein the first signal includes a second security key. The method may include receiving a second signal associated with a downlink shared channel, wherein the second signal includes a third security key, and wherein the second signal is authenticated by the UE based at least in part on the first security key, the second security key, and the third security key.

Some aspects described herein relate to a method of wireless communication performed by a base station. The method may include transmitting, to an RIS, an indication of a first security key associated with the RIS, wherein the first security key is to be added, using a modulation signature, to signals reflected by the RIS. The method may include transmitting a first signal that is associated with a downlink control channel, wherein the first signal includes a second security key, and wherein the first signal is to be reflected by the RIS. The method may include transmitting a second signal that is associated with a downlink shared channel, wherein the second signal includes a third security key, and wherein the first security key, the second security key, and the third security key enable a UE to authenticate the second signal.

Some aspects described herein relate to a method of wireless communication performed by an RIS. The method may include receiving, from a base station, an indication of a first security key associated with the RIS, wherein the first security key is to be added, using a modulation signature, to signals reflected by the RIS. The method may include receiving, from the base station, a first signal associated with a downlink control channel, wherein the first signal includes a second security key. The method may include redirecting, to a UE, the first signal by including the modulation signature that identifies the first security key in the first signal. The method may include redirecting, to the UE, a second signal, wherein the second signal includes a third security key, and wherein the first security key, the second security key, and the third security key enable the UE to authenticate the second signal.

Some aspects described herein relate to a UE for wireless communication. The user equipment may include a memory and one or more processors coupled to the memory. The one or more processors may be configured to receive a first signal associated with a downlink control channel, wherein the first signal uses a modulation signature that identifies a first security key associated with an RIS, and wherein the first signal includes a second security key. The one or more processors may be configured to receive a second signal associated with a downlink shared channel, wherein the second signal includes a third security key, and wherein the second signal is authenticated by the UE based at least in part on the first security key, the second security key, and the third security key.

Some aspects described herein relate to a base station for wireless communication. The base station may include a memory and one or more processors coupled to the memory. The one or more processors may be configured to transmit, to an RIS, an indication of a first security key associated with the RIS, wherein the first security key is to be added, using a modulation signature, to signals reflected by the RIS. The one or more processors may be configured to transmit a first signal that is associated with a downlink control channel, wherein the first signal includes a second security key, and wherein the first signal is to be reflected by the RIS. The one or more processors may be configured to transmit a second signal that is associated with a downlink shared channel, wherein the second signal includes a third security key, and wherein the first security key, the second security key, and the third security key enable a UE to authenticate the second signal.

Some aspects described herein relate to an RIS for wireless communication. The reconfigurable intelligent surface may include a memory and one or more processors coupled to the memory. The one or more processors may be configured to receive, from a base station, an indication of a first security key associated with the RIS, wherein the first security key is to be added, using a modulation signature, to signals reflected by the RIS. The one or more processors may be configured to receive, from the base station, a first signal associated with a downlink control channel, wherein the first signal includes a second security key. The one or more processors may be configured to redirect, to a UE, the first signal by including the modulation signature that identifies the first security key in the first signal. The one or more processors may be configured to redirect, to the UE, a second signal, wherein the second signal includes a third security key, and wherein the first security key, the second security key, and the third security key enable the UE to authenticate the second signal.

Some aspects described herein relate to a non-transitory computer-readable medium that stores a set of instructions for wireless communication by a UE. The set of instructions, when executed by one or more processors of the UE, may cause the UE to receive a first signal associated with a downlink control channel, wherein the first signal uses a modulation signature that identifies a first security key associated with an RIS, and wherein the first signal includes a second security key. The set of instructions, when executed by one or more processors of the UE, may cause the UE to receive a second signal associated with a downlink shared channel, wherein the second signal includes a third security key, and wherein the second signal is authenticated by the UE based at least in part on the first security key, the second security key, and the third security key.

Some aspects described herein relate to a non-transitory computer-readable medium that stores a set of instructions for wireless communication by a base station. The set of instructions, when executed by one or more processors of the base station, may cause the base station to transmit, to an RIS, an indication of a first security key associated with the RIS, wherein the first security key is to be added, using a modulation signature, to signals reflected by the RIS. The set of instructions, when executed by one or more processors of the base station, may cause the base station to transmit a first signal that is associated with a downlink control channel, wherein the first signal includes a second security key, and wherein the first signal is to be reflected by the RIS. The set of instructions, when executed by one or more processors of the base station, may cause the base station to transmit a second signal that is associated with a downlink shared channel, wherein the second signal includes a third security key, and wherein the first security key, the second security key, and the third security key enable a UE to authenticate the second signal.

Some aspects described herein relate to a non-transitory computer-readable medium that stores a set of instructions for wireless communication by an RIS. The set of instructions, when executed by one or more processors of the RIS, may cause the RIS to receive, from a base station, an indication of a first security key associated with the RIS, wherein the first security key is to be added, using a modulation signature, to signals reflected by the RIS. The set of instructions, when executed by one or more processors of the RIS, may cause the RIS to receive, from the base station, a first signal associated with a downlink control channel, wherein the first signal includes a second security key. The set of instructions, when executed by one or more processors of the RIS, may cause the RIS to redirect, to a UE, the first signal by including the modulation signature that identifies the first security key in the first signal. The set of instructions, when executed by one or more processors of the RIS, may cause the RIS to redirect, to the UE, a second signal, wherein the second signal includes a third security key, and wherein the first security key, the second security key, and the third security key enable the UE to authenticate the second signal.

Some aspects described herein relate to an apparatus for wireless communication. The apparatus may include means for receiving a first signal associated with a downlink control channel, wherein the first signal uses a modulation signature that identifies a first security key associated with an RIS, and wherein the first signal includes a second security key. The apparatus may include means for receiving a second signal associated with a downlink shared channel, wherein the second signal includes a third security key, and wherein the second signal is authenticated by the apparatus based at least in part on the first security key, the second security key, and the third security key.

Some aspects described herein relate to an apparatus for wireless communication. The apparatus may include means for transmitting, to an RIS, an indication of a first security key associated with the RIS, wherein the first security key is to be added, using a modulation signature, to signals reflected by the RIS. The apparatus may include means for transmitting a first signal that is associated with a downlink control channel, wherein the first signal includes a second security key, and wherein the first signal is to be reflected by the RIS. The apparatus may include means for transmitting a second signal that is associated with a downlink shared channel, wherein the second signal includes a third security key, and wherein the first security key, the second security key, and the third security key enable a UE to authenticate the second signal.

Some aspects described herein relate to an apparatus for wireless communication. The apparatus may include means for receiving, from a base station, an indication of a first security key associated with the apparatus, wherein the first security key is to be added, using a modulation signature, to signals reflected by the apparatus. The apparatus may include means for receiving, from the base station, a first signal associated with a downlink control channel, wherein the first signal includes a second security key. The apparatus may include means for redirecting, to a UE, the first signal by including the modulation signature that identifies the first security key in the first signal. The apparatus may include means for redirecting, to the UE, a second signal, wherein the second signal includes a third security key, and wherein the first security key, the second security key, and the third security key enable the UE to authenticate the second signal.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
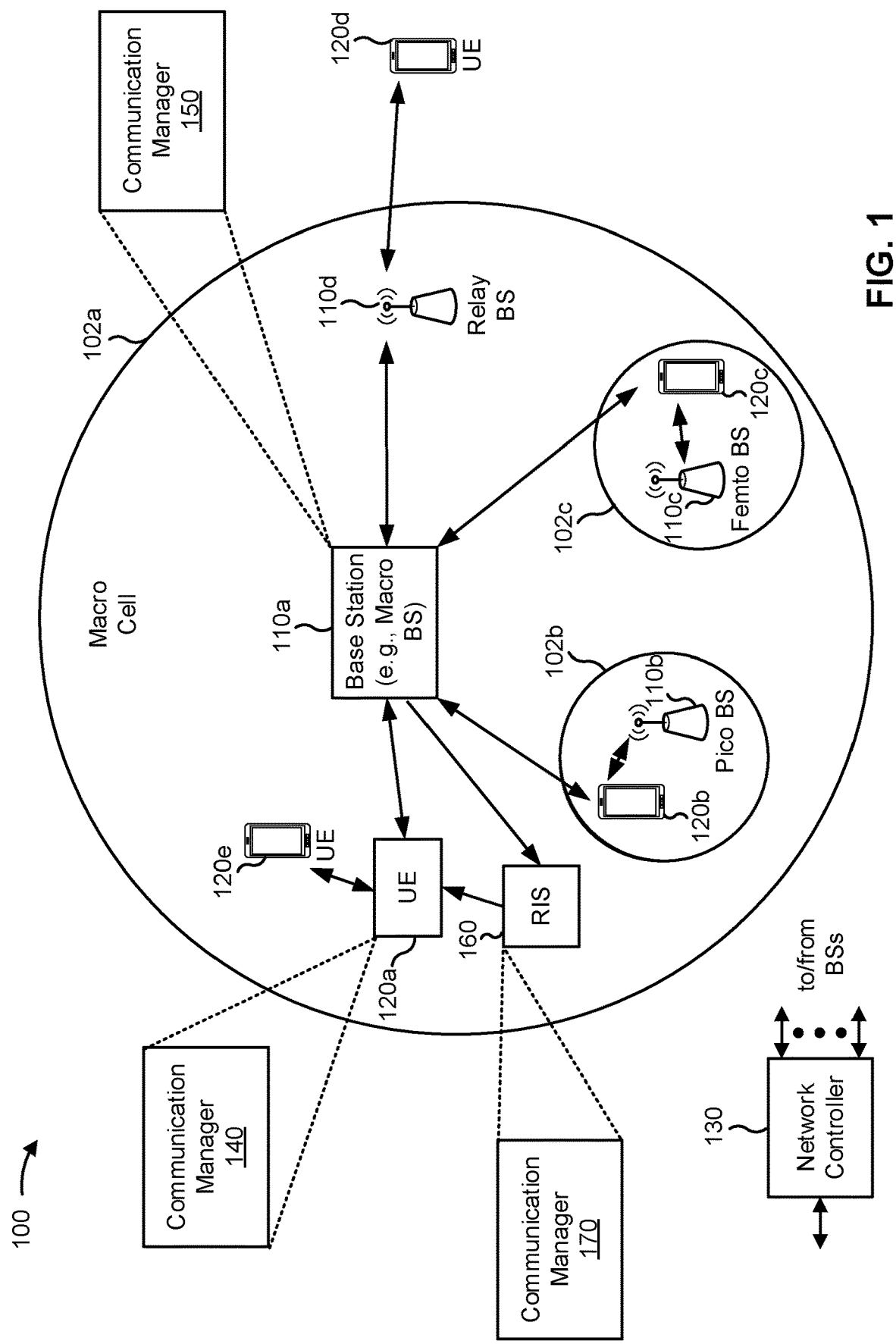
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a first signal associated with a downlink control channel, wherein the first signal uses a modulation signature that identifies a first security key associated with a reconfigurable intelligent surface (RIS) 160, and wherein the first signal includes a second security key; and receive a second signal associated with a downlink shared channel, wherein the second signal includes a third security key, and wherein the second signal is authenticated by the UE based at least in part on the first security key, the second security key, and the third security key. Additionally, or alternatively, the communication manager 140 may perform one or more other operations described herein.

In some aspects, the base station 110 may include a communication manager 150. As described in more detail elsewhere herein, the communication manager 150 may transmit, to the RIS 160, an indication of a first security key associated with the RIS, wherein the first security key is to be added, using a modulation signature, to signals reflected by the RIS; transmit a first signal that is associated with a downlink control channel, wherein the first signal includes a second security key, and wherein the first signal is to be reflected by the RIS; and transmit a second signal that is associated with a downlink shared channel, wherein the second signal includes a third security key, and wherein the first security key, the second security key, and the third security key enable a UE 120 to authenticate the second signal. Additionally, or alternatively, the communication manager 150 may perform one or more other operations described herein.

As shown in FIG. 1, the wireless network 100 may include an RIS 160. The RIS 160 may include one or more reconfigurable elements capable of redirecting or reflecting signals transmitted by a base station 110 or a UE 120. In some aspects, the RIS 160 may include a communication manager 170. As described in more detail elsewhere herein, the communication manager 170 may receive, from a base station, an indication of a first security key associated with the RIS, wherein the first security key is to be added, using a modulation signature, to signals reflected by the RIS; receive, from the base station, a first signal associated with a downlink control channel, wherein the first signal includes a second security key; redirect, to a UE 120, the first signal by including the modulation signature that identifies the first security key in the first signal; and redirect, to the UE, a second signal, wherein the second signal includes a third security key, and wherein the first security key, the second security key, and the third security key enable the UE to authenticate the second signal. Additionally, or alternatively, the communication manager 170 may perform one or more other operations described herein.

As indicated above, FIG. 1 is provided as an example. Other examples may differ from what is described with regard to FIG. 1.

Figure 2:
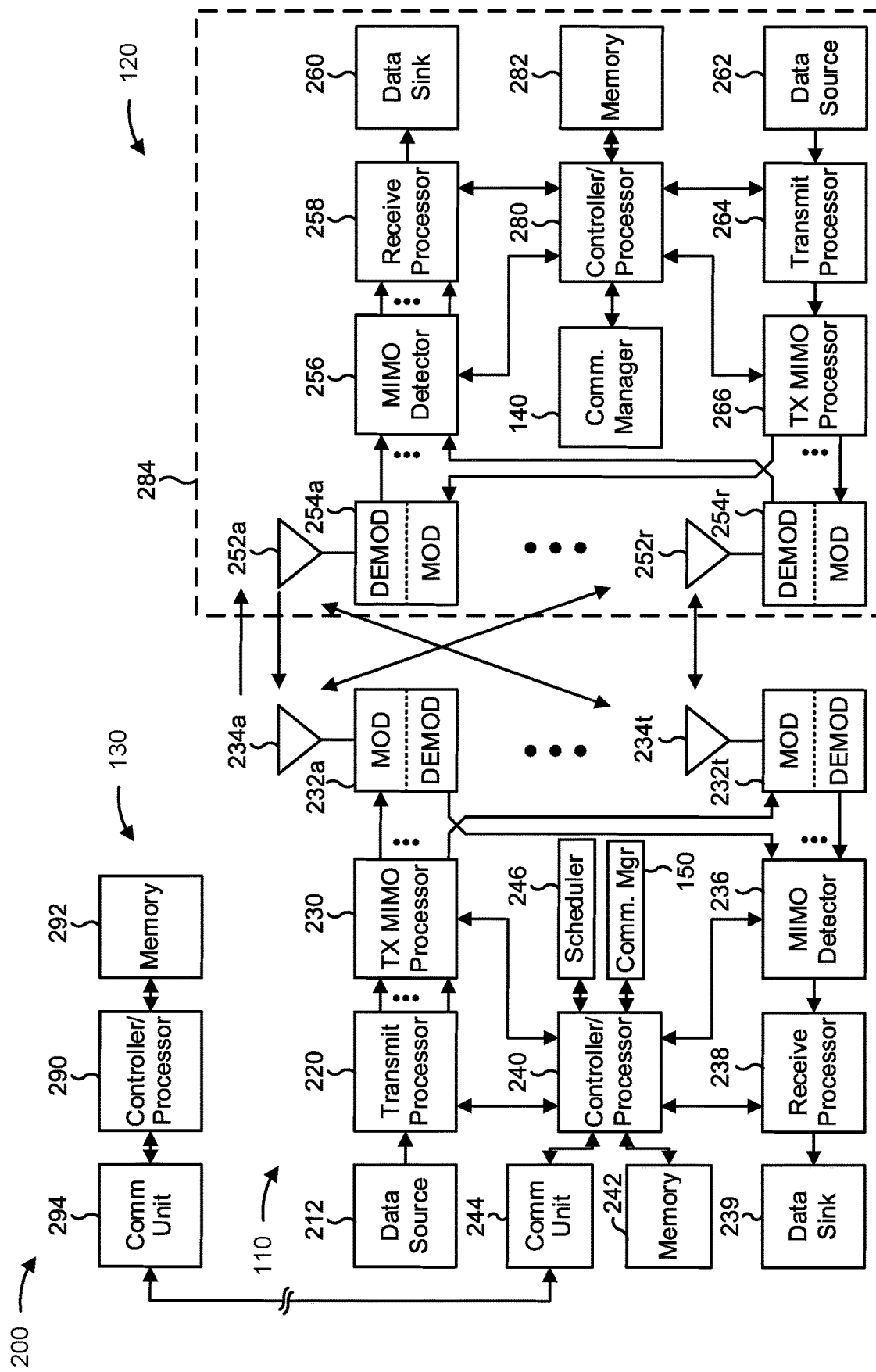
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R>1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-13).

The controller/processor 240 of the base station 110, the controller/processor 280 of the UE 120, and/or any other component(s) of FIG. 2 may perform one or more techniques associated with security enhancements with an RIS, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for receiving a first signal associated with a downlink control channel, wherein the first signal uses a modulation signature that identifies a first security key associated with an RIS, and wherein the first signal includes a second security key; and/or means for receiving a second signal associated with a downlink shared channel, wherein the second signal includes a third security key, and wherein the second signal is authenticated by the UE based at least in part on the first security key, the second security key, and the third security key. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to an RIS, an indication of a first security key associated with the RIS, wherein the first security key is to be added, using a modulation signature, to signals reflected by the RIS; means for transmitting a first signal that is associated with a downlink control channel, wherein the first signal includes a second security key, and wherein the first signal is to be reflected by the RIS; and/or means for transmitting a second signal that is associated with a downlink shared channel, wherein the second signal includes a third security key, and wherein the first security key, the second security key, and the third security key enable a UE to authenticate the second signal. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the RIS 160 includes means for receiving, from a base station, an indication of a first security key associated with the RIS, wherein the first security key is to be added, using a modulation signature, to signals reflected by the RIS; means for receiving, from the base station, a first signal associated with a downlink control channel, wherein the first signal includes a second security key; means for redirecting, to a UE, the first signal by including the modulation signature that identifies the first security key in the first signal; and/or means for redirecting, to the UE, a second signal, wherein the second signal includes a third security key, and wherein the first security key, the second security key, and the third security key enable the UE to authenticate the second signal. In some aspects, the means for the RIS 160 to perform operations described herein may include, for example, one or more of communication manager 170, a transmit processor, a TX MIMO processor, a modem, an antenna, a MIMO detector, a receive processor, a controller/processor, and/or a memory.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
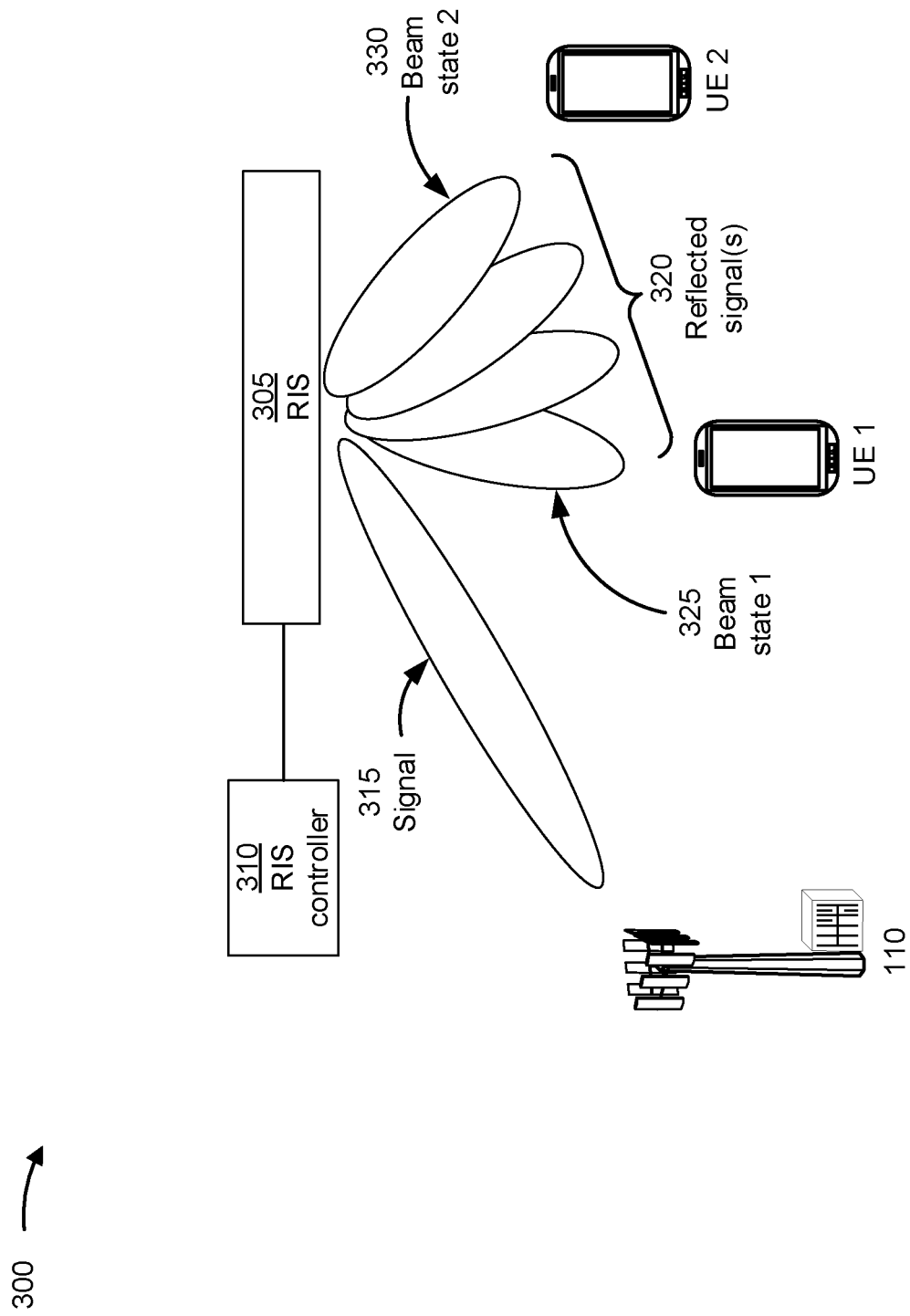
FIG. 3 is a diagram illustrating an example of communications using a reconfigurable intelligent surface (RIS), in accordance with the present disclosure.

FIG. 3 is a diagram illustrating an example 300 of communications using an RIS, in accordance with the present disclosure. As shown in FIG. 3, a base station 110 may communicate with a UE 120 in a wireless network, such as the wireless network 100. The base station 110 and the UE 120 may use an RIS 305 to communicate with one another. For example, the RIS 305 may reflect or redirect a signal to the base station 110 and/or the UE 120. The RIS 305 may also be referred to as an intelligent reflecting surface. In some examples, the RIS 305 may be a repeater.

The RIS 305 may be, or may include, a planar or two-dimensional structure or surface that is designed to have properties to enable a dynamic control of signals or electromagnetic waves reflected and/or redirected by the RIS 305. The RIS 305 may include one or more reconfigurable elements. For example, the RIS 305 may include an array of reconfigurable elements (e.g., an array of uniformly distributed reconfigurable elements). The reconfigurable elements may be elements with a reconfigurable electromagnetic characteristic. For example, the electromagnetic characteristic may include a reflection characteristic (e.g., a reflection coefficient), a scattering characteristic, an absorption characteristic, and/or a diffraction characteristic. The electromagnetic characteristic(s) of each reconfigurable element may be independently controlled and changed over time. The electromagnetic characteristic(s) of each reconfigurable element may be independently configured such that the combination of configured states of the reconfigurable elements reflects an incident signal or waveform in a controlled manner. For example, the reconfigurable elements may be configured to reflect or redirect an impinging signal in a controlled manner, such as by reflecting the impinging signal in a desired direction, with a desired beam width, with a desired phase, with a desired amplitude, and/or with a desired polarization, among other examples. In other words, the RIS 305 may be capable of modifying one or more properties (e.g., direction, beam width, phase, amplitude, and/or polarization) of an impinging signal.

The reconfigurable elements of the RIS 305 may be controlled and/or configured by an RIS controller 310. The RIS controller 310 may be a control module (e.g., a controller and/or a processor) that is capable of configuring the electromagnetic characteristic(s) of each reconfigurable element of the RIS 305. The RIS controller 310 may be, or may be included in, the communication manager 170. Alternatively, the communication manager 170 may be included in the RIS controller 310. The RIS controller 310 may receive control communications (e.g., from a base station 110 and/or a UE 120) indicating one or more properties of reflected signals (e.g., indicating a desired direction, a desired beam width, a desired phase, a desired amplitude, and/or a desired polarization). Therefore, in some examples, the RIS 305 may be capable of receiving communications (e.g., via the RIS 305 and/or the RIS controller 310). In some examples, the RIS 305 and/or the RIS controller 310 may not have transmit capabilities (e.g., the RIS 305 may be capable of reflecting and/or redirecting impinging signals via the reconfigurable elements, but may not be capable of generating and/or transmitting signals). Alternatively, in some examples, the RIS 305 and/or the RIS controller 310 may have transmit capabilities (e.g., the RIS 305 may be capable of reflecting and/or redirecting impinging signals via the reconfigurable elements and may be capable of generating and/or transmitting signals). For example, the RIS 305 and/or the RIS controller 310 may include one or more antennas and/or antenna elements for receiving and/or transmitting signals.

For example, as shown in FIG. 3, the base station 110 may transmit a signal 315. The signal 315 may be transmitted in a spatial direction toward the RIS 305. The RIS 305 may configure the reconfigurable elements of the RIS 305 to reflect and/or redirect the signal 315 in a desired spatial direction and/or with one or more desired signal characteristics (e.g., beam width, phase, amplitude, frequency, and/or polarization). For example, as shown by reference number 320, the RIS 305 may be capable of reflecting the signal 315 in one or more spatial directions. Although multiple beams are shown in FIG. 3 representing different beam states or beam directions of the RIS 305, the RIS 305 may be capable of reflecting a signal with one beam state or one beam direction at a time. For example, in one case, as shown by reference number 325, the RIS 305 may be configured to reflect the signal 315 using a first beam state (e.g., beam state 1). "Beam state" may refer to a spatial direction and/or a beam of a reflected signal (e.g., a signal reflected by the RIS 305). The first beam state may cause the signal 315 to be reflected in a spatial direction toward a first UE 120 (e.g., UE 1). As shown by reference number 330, in another case, the RIS 305 may be configured to reflect the signal 315 using a second beam state (e.g., beam state 2). The second beam state may cause the signal 315 to be reflected in a spatial direction toward a second UE 120 (e.g., UE 2).

The RIS 305 may be deployed in a wireless network (such as the wireless network 100) to improve communication performance and efficiency. For example, the RIS 305 may enable a transmitter (e.g., a base station 110 or a UE 120) to control the scattering, reflection, and refraction characteristics of signals transmitted by the transmitter, to overcome the negative effects of wireless propagation. For example, the RIS 305 may effectively control signal characteristics (e.g., spatial direction, beam width, phase, amplitude, frequency, and/or polarization) of an impinging signal without a need for complex decoding, encoding, and radio frequency processing operations. Therefore, the RIS 305 may provide increased channel diversity for propagation of signals in a wireless network. The increased channel diversity provides robustness to channel fading and/or blocking, such as when higher frequencies are used by the base station 110 and/or the UE 120 (e.g., millimeter wave frequencies and/or subterahertz frequencies). Moreover, as the RIS 305 does not need to perform complex decoding, encoding, and radio frequency processing operations, the RIS 305 may provide a more cost and energy efficient manner of reflecting and/or redirecting signals in a wireless network (e.g., as compared to other mechanisms for reflecting and/or redirecting signals, such as a relay device).

As indicated above, FIG. 3 is provided as an example. Other examples may differ from what is described with respect to FIG. 3.

Figure 4:
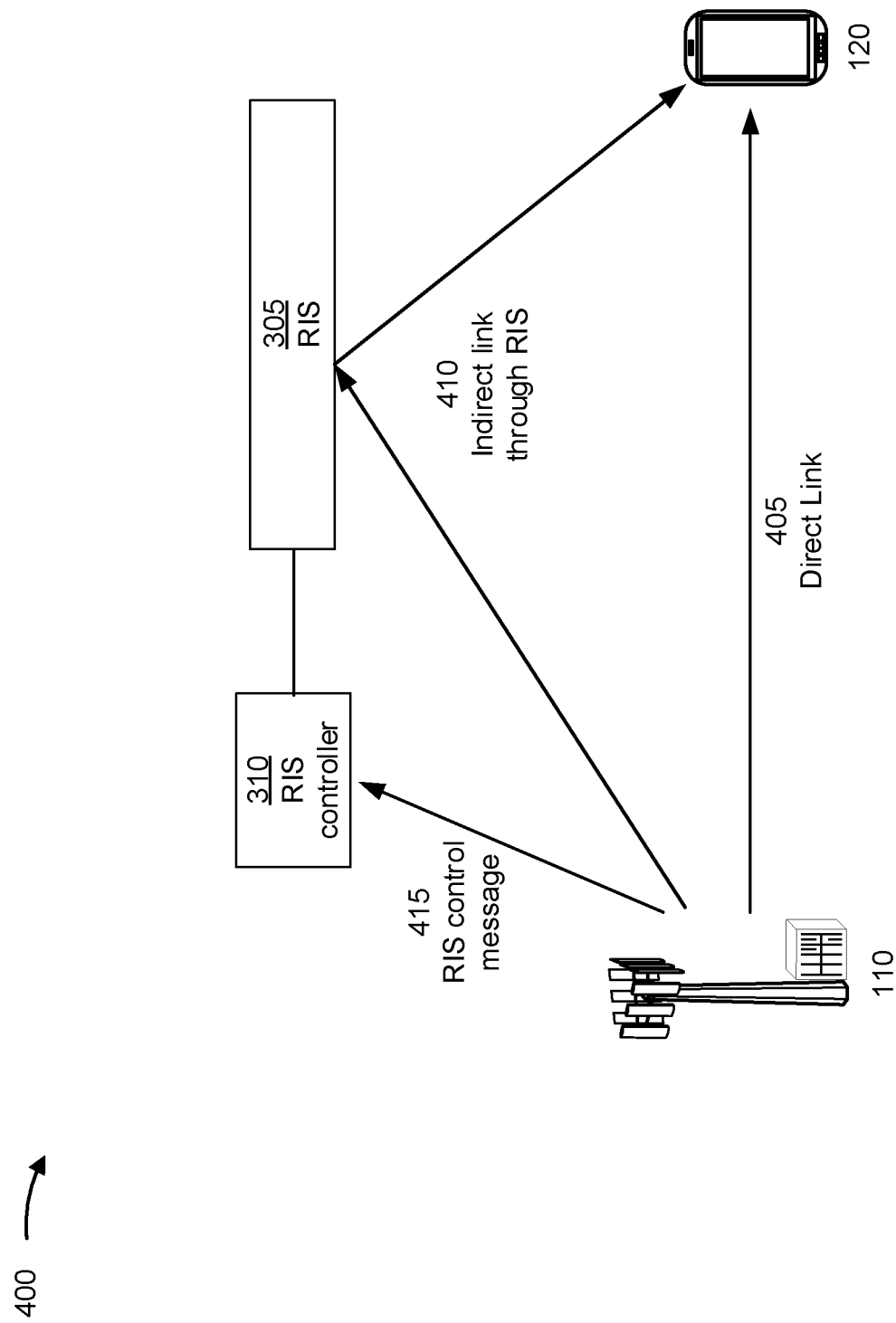
FIG. 4 is a diagram illustrating an example of communication links in a wireless network that includes an RIS, in accordance with the present disclosure.

FIG. 4 is a diagram illustrating an example 400 of communication links in a wireless network that includes an RIS, in accordance with the present disclosure. As shown, example 400 includes a base station 110, a UE 120, and the RIS 305. The RIS 305 may be controlled and/or configured by the RIS controller 310.

As shown in FIG. 4, the UE 120 may receive a communication (e.g., data and/or control information) directly from the base station 110 as a downlink communication. Additionally, or alternatively, the UE 05 may receive a communication (e.g., data and/or control information) indirectly from the base station 110 via the RIS 305. For example, the base station 110 may transmit the communication in a spatial direction toward the RIS 305, and the RIS 305 may redirect or reflect the communication to the UE 120.

In some examples, the UE 120 may communicate directly with the base station 110 via a direct link 405. For example, a communication may be transmitted via the direct link 405. A communication transmitted via the direct link 405 between the UE 120 and the base station 110 does not pass through and is not reflected or redirected by the RIS 305. In some examples, the UE 120 may communicate indirectly with the base station 110 via an indirect link 410. For example, a communication may be transmitted via different segments of the indirect link 410. A communication transmitted via the indirect link 410 between the UE 120 and the base station 110 is reflected and/or redirected by the RIS 305. As shown in FIG. 4 and by reference number 415, the base station 110 may communicate with the RIS 305 (e.g., with the RIS controller 310) via a control channel. For example, the base station 110 may indicate, in an RIS control message, spatial direction(s) and/or signal characteristics for signals reflected by the RIS 305. The RIS controller 310 may configure reconfigurable elements of the RIS 305 in accordance with the RIS control message. In some examples, the RIS control message may indicate information associated with the wireless network, such as a frame structure, time synchronization information, and/or slot boundaries, among other examples. Using the communication scheme shown in FIG. 4 may improve network performance and increase reliability by providing the UE 120 with link diversity for communicating with the base station 110.

In some cases, the UE 120 may receive a communication (e.g., the same communication) from the base station 110 via both the direct link 405 and the indirect link 410. In other cases, the base station 110 may select one of the links (e.g., either the direct link 405 or the indirect link 410), and may transmit a communication to the UE 120 using only the selected link. Alternatively, the base station 110 may receive an indication of one of the links (e.g., either the direct link 405 or the indirect link 410), and may transmit a communication to the UE 120 using only the indicated link. The indication may be transmitted by the UE 120 and/or the RIS 305. In some examples, such selection and/or indication may be based at least in part on channel conditions and/or link reliability.

However, channel characteristics of the direct link 405 and the indirect link 410 may be different. For example, the direct link 405 and the indirect link 410 may be distinguishable in the spatial domain and/or the time domain. Additionally, or alternatively, the direct link 405 and the indirect link 410 may be associated with different Doppler characteristics (e.g., Doppler spread and/or Doppler shift). Therefore, the direct link 405 and the indirect link 410 may need to be separately maintained. For example, separate beam management (e.g., separate beam acquisition and/or beam tracking) may need to be performed for the direct link 405 and the indirect link 410. As another example, transmit and/or receive processing of signals associated with the direct link 405 and the indirect link 410 may be different due to different path delays and/or Doppler characteristics, and/or due to separate time and/or frequency synchronizations of the direct link 405 and the indirect link 410. Moreover, transmit power allocation for the direct link 405 and the indirect link 410 may be different due to different fading conditions of the direct link 405 and the indirect link 410. As a result, the direct link 405 and the indirect link 410 may be maintained simultaneously, but may need to be treated separately (e.g., by the base station 110 and/or the UE 120).

As indicated above, FIG. 4 is provided as an example. Other examples may differ from what is described with respect to FIG. 4.

Wireless communication systems may use a variety RATs, such as Global System for Mobility (GSM), UMTS, LTE, and NR. Typically, RATs can be configured to provide security functionality such as ciphering and integrity protection, which may be applied to both a control plane (e.g., radio resource control (RRC) signaling through a signaling radio bearer) and a user plane (e.g., a data radio bearer) in a packet data convergence protocol (PDCP) layer. Various radio access technologies may also provide access control through authentication (e.g., via Access Security Management Entity keys or another suitable system).

However, some scheduled communications are not typically protected, such as medium access control (MAC) signaling (e.g., MAC control element (MAC-CE) signaling), broadcast information (e.g., system information block (SIB) signals), and paging information, and/or downlink communication channels (e.g., the physical downlink control channel (PDCCH) and the physical downlink shared channel (PDSCH)), among other examples. MAC signaling, broadcast information (e.g., SIB signals), and paging information are typically not protected by security functionalities because speed of communication (e.g., minimizing transfer delay) is judged more important than security for these signals. However, the signals provided in the PDCCH and PDSCH may include control information and content data (e.g., voice, and/or content for user services), and thus security may be more important for these signals. Malicious intruders or jammers may hinder or hijack the unprotected signals by fabricating a transmission with the same format (e.g., an appropriate PDCCH or PDSCH format). Without security protection, a wireless device intended to receive the PDCCH or PDSCH signals may be unable to distinguish between true and fabricated transmissions.

Some techniques and apparatuses described herein enable security enhancements using an RIS. For example, an RIS may use a modulation signature (e.g., watermarking) to insert a signature or a security key that can be used (e.g., by a UE) to authenticate a message that has been reflected or redirected by the RIS. For example, the RIS may be configured (e.g., by a base station) with a first security key. The RIS may insert the first security key into a signal using modulation (e.g., phase modulation, amplitude modulation, and/or other types of modulation). A UE may receive a signal redirected by the RIS (e.g., that has been modulated with a modulation signature that identifies the first security key). The UE may decode the signal to obtain the first security key. The UE may receive a signal transmitted on a downlink control channel (e.g., a PDCCH). The signal associated with the PDCCH may indicate a second security key. In some aspects, a PDCCH signal may include the second security key in a payload of the PDCCH signal. The PDCCH signal may be modulated by an RIS using a modulation signature, such that the UE may obtain the first security key based on the modulation signature and may obtain the second security key based on the payload of the PDCCH signal. The UE may receive a signal transmitted on a downlink shared channel (e.g., a PDSCH). The PDSCH signal may include a third security key (e.g., in a payload of the PDSCH signal). The PDSCH signal may be redirected to the UE by the RIS. The UE may authenticate the PDSCH signal based on the first security key, the second security key, and the third security key. For example, the UE may use an authentication function that uses the first security key and the second security key as inputs. The UE may compare an output of the authentication function to the third security key. If the output of the authentication function and the third security key match (e.g., are the same), then the UE 120 may determine that the PDSCH signal is authentic. If the output of the authentication function and the third security key do not match (e.g., are not the same), then the UE 120 may determine that the PDSCH signal is not authentic (e.g., and may block, or not permit further communication with, a device associated with the PDSCH signal).

As a result, a security associated with signals redirected by an RIS may be improved. For example, the UE may be enabled to identify fake and/or fabricated transmissions associated with the RIS and may be enabled to block or not receive further communications from the device that transmitted the fake and/or fabricated transmissions. Some techniques and apparatuses described herein enable improved security for MAC signaling, broadcast signaling, and/or paging signaling associated with an RIS.

Figure 5:
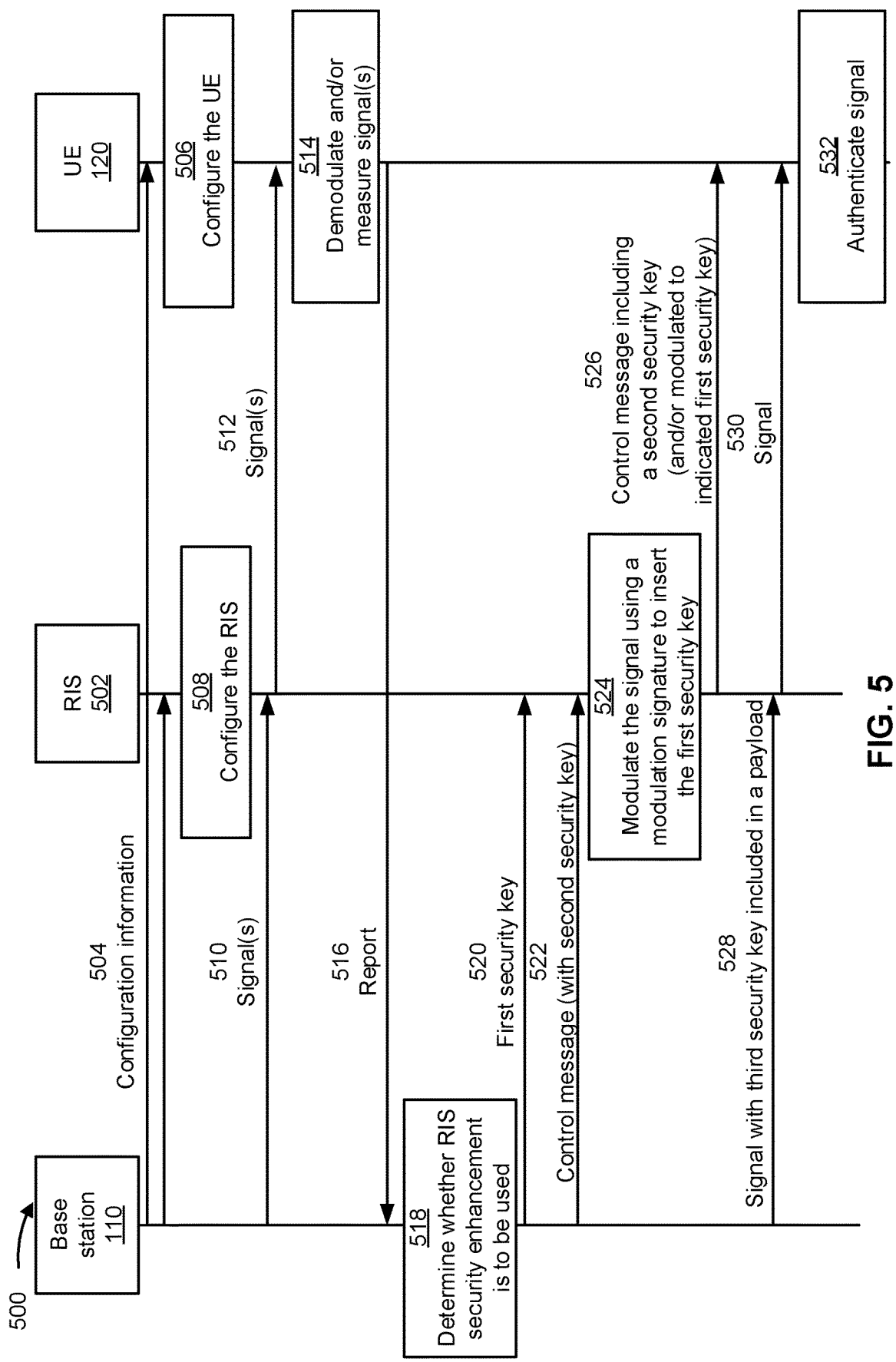
FIGS. 5 and 6 are diagrams illustrating examples associated with security enhancements with an RIS, in accordance with the present disclosure.

FIG. 5 is a diagram illustrating an example 500 associated with security enhancements associated with an RIS, in accordance with the present disclosure. As shown in FIG. 5, a base station 110 and a UE 120 may communicate with one another in a wireless network, such as the wireless network 100. As shown in FIG. 5, in some aspects, the UE 120 and the base station 110 may communicate via an RIS 502. The RIS 502 may be similar to the RIS 305 and/or the RIS 160 described elsewhere herein.

As shown by reference number 504, the base station 110 may transmit (e.g., using controller/processor 240, transmit processor 220, TX MIMO processor 230, MOD 232, antenna 234, and/or memory 242), and the UE 120 (e.g., using antenna 252, DEMOD 254, MIMO detector 256, receive processor 258, controller/processor 280, and/or memory 282) and/or the RIS 502 may receive, configuration information. In some aspects, the UE 120 may receive configuration information from another device (e.g., from another base station or another UE). In some aspects, the UE 120 may receive the configuration information via system information signaling, RRC signaling and/or MAC signaling (e.g., MAC-CEs). In some aspects, the configuration information may include an indication of one or more configuration parameters (e.g., already known to the UE 120) for selection by the UE 120 and/or explicit configuration information for the UE 120 to use to configure itself.

In some aspects, the configuration information may indicate that an indirect link between the base station 110, the RIS 502, and the UE 120 is to be established and/or maintained. In some aspects, the configuration information may indicate a security enhancement, using the RIS 502, for signaling between the base station 110 and the UE 120 (e.g., using the security keys described herein). The security enhancement may be enabled and/or activated via the configuration information. In some aspects, the security enhancement may be enabled and/or activated in a different message (e.g., based at least in part on a report provided by the UE 120, as described in more detail elsewhere herein). As used herein, "security enhancement" may refer to authenticating PDSCH messages using a security key that is added to a signal by an RIS using a modulation signature, as described in more detail elsewhere herein. In some aspects, the security enhancement may be a physical layer security enhancement.

In some aspects, the configuration information may indicate that the UE 120 is to transmit an RIS report to the base station 110 (e.g., associated with the RIS 502 and/or other RISs deployed in the wireless network). The RIS report may be a report for a link associated with the RIS 502 (and/or other RISs deployed in the wireless network). The report may indicate an identifier associated with the RIS 502 and/or one or more measurements of one or more signals transmitted via the link with the RIS 502, among other examples. The RIS report may enable the base station 110 to determine whether the security enhancement described herein is to be activated for the UE 120, as described in more detail elsewhere herein. In some aspects, the configuration information may indicate one or more threshold values and/or conditions associated with using the security enhancement described herein. For example, the configuration information may indicate one or more threshold values associated with a link quality of the RIS link associated with the RIS 502. If a measured quality (e.g., a measured RSRQ or other link quality parameter) of the RIS link satisfies the one or more threshold values, then the UE 120 and/or the base station 110 may determine that the security enhancement may be used for the RIS link.

In some aspects, the configuration information may indicate an authentication function associated with the security enhancement. The authentication function may be a function that enables the UE 120 to obtain an authentication key from one or more security keys. The authentication key may be compared to a security key included in a PDSCH message to authenticate the PDSCH message, as described in more detail elsewhere herein. In some other aspects, the authentication function may be pre-configured on the UE 120 (e.g., without receiving any signaling indicating the authentication function).

In some aspects, the configuration information may indicate a modulation signature associated with the RIS 502. "Modulation signature" may refer to a pattern or sequence of modulation added to a signal that is reflected or redirected by the RIS 502. The modulation signature may also be referred to as an RIS watermark. For example, the modulation signature may be a phase modulation signature, a polarization modulation signature, and/or an amplitude modulation signature, among other examples. In some aspects, the configuration information may indicate a beam state or a beam direction of the RIS 502 that is associated with the modulation signature (e.g., multiple modulation signatures may be indicated for multiple beam states and/or beam directions of the RIS 502). In some aspects, the configuration information may indicate a pattern or sequence associated with the modulation signature. In some aspects, the configuration information may indicate that the RIS 502 is to modulate a signal reflected by the RIS, in accordance with the modulation signature, at symbol boundaries and/or in symbols that contain a reference signal (e.g., a DMRS, a phase tracking reference signal (PTRS), and/or a polarization detection reference signal). In some aspects, the configuration information may configure the reference signal that is to be associated with the signal to be reflected by the RIS 502. For example, if the modulation signature is a phase modulation signature, then the configuration information may configure DMRSs and/or PTRSs to be transmitted with the signal. Similarly, if the modulation signature is a polarization modulation signature, then the configuration information may configure polarization detection reference signals and/or other reference signals to be transmitted with the signal. The reference signals may enable the UE 120 to identify and/or detect the modulation of the signal. In some aspects, the modulation signature may identify a security key, as described in more detail elsewhere herein. Additionally, or alternatively, the modulation signature may identify an identifier of the RIS 502.

As shown by reference number 506, the UE 120 may configure (e.g., using controller/processor 280 and/or memory 282) the UE 120 for communicating with the base station 110 and/or with the RIS 502. In some aspects, the UE 120 may configure the UE 120 based at least in part on the configuration information. In some aspects, the UE 120 may be configured to perform one or more operations described herein. As shown by reference number 508, the RIS 502 (and/or an RIS controller of the RIS 502) may configure the RIS 502 for communicating with the base station 110 and/or the UE 120. In some aspects, the RIS 502 (and/or an RIS controller of the RIS 502) may configure the RIS 502 based at least in part on the configuration information. In some aspects, the RIS 502 may be configured to perform one or more operations described herein.

In some aspects, the UE 120 may transmit (e.g., using controller/processor 280, transmit processor 264, TX MIMO processor 266, MOD 254, antenna 252, and/or memory 282), and the base station 110 may receive (e.g., using antenna 234, DEMOD 232, MIMO detector 236, receive processor 238, controller/processor 240, and/or memory 242), a capability message indicating whether the UE 120 supports the security enhancement described herein. For example, the UE 120 may transmit, and the base station 110 may receive, a message indicating whether the UE 120 is capable of authenticating PDSCH messages using a security key that is indicated by a signal via a modulation signature added by an RIS. In some aspects, the configuration information may be based at least in part on the capability message (e.g., the base station 110 may configure the UE 120 to use the security enhancement only if the UE 120 indicates that the UE 120 supports the security enhancement). The UE 120 may transmit the capability message via RRC signaling and/or physical uplink control channel (PUCCH) signaling, among other examples.

As shown by reference number 510, the base station 110 may transmit (e.g., using controller/processor 240, transmit processor 220, TX MIMO processor 230, MOD 232, antenna 234, and/or memory 242) one or more signals. The one or more signals may be transmitted on a beam associated with, and/or in a spatial direction toward, the RIS 502. The one or more signals may be reference signals. In some aspects, the one or more signals may be an RIS reference signal. The RIS reference signal may be associated with measuring link parameters (e.g., link quality, signal strength, and/or other parameters) of an RIS link (e.g., an indirect link associated with an RIS). The one or more signals may be used by the UE 120 to measure link parameters and/or to identify the RIS link.

As shown by reference number 512, the RIS 502 may reflect and/or redirect the one or more signals toward the UE 120 (e.g., using a beam associated with the UE 120 and/or in a spatial direction toward the UE 120). The RIS 502 may modulate the signal (e.g., the impinging signal that arrives at the RIS 502) using a modulation signature that identifies an identifier associated with the RIS 502. For example, the RIS 502 may modulate the signal in phase (e.g., for a phase modulation signature), may modulate a polarization of the signal (e.g., for a polarization modulation signature), and/or may modulate an amplitude of the signal (e.g., for an amplitude modulation signature). For example, for a phase modulation signature and/or a polarization modulation signature, the RIS 502 may modulate the signal in symbols of the signal that include a reference signal (e.g., a DMRS, a PTRS, and/or a polarization detection reference signal). As another example, for a polarization modulation signature, the RIS 502 may modulate a polarization state of the signal from a first polarization state of the signal as transmitted by the base station 110 to a second polarization state of the signal. A polarization state may include an angle of polarization or a polarization mode. For an amplitude modulation signature, the RIS 502 may modulate the amplitude of the signal by attenuating the amplitude of the signal in accordance with a pattern (e.g., the amplitude modulation signature) that identifies the RIS 502. The RIS 502 may modulate the amplitude of the signal by puncturing the signal at one or more symbols of the signal, and/or by modulating a spatial direction of the signal.

As shown by reference number 514, the UE 120 may receive (e.g., using antenna 252, DEMOD 254, MIMO detector 256, receive processor 258, controller/processor 280, and/or memory 282) a signal (e.g., a modulated signal) that is redirected or reflected by the RIS 502. The signal may be modulated by the RIS 502 using the modulation signature, as described in more detail elsewhere herein. The UE 120 may demodulate and/or decode the signal (e.g., the modulated signal) to identify that the signal was transmitted via a link that includes the RIS 502. For example, the UE 120 may detect phase changes, polarization changes, and/or amplitude changes in the signal. The UE 120 may detect that the phase changes, polarization changes, and/or amplitude changes vary in a pattern or sequence that corresponds to the modulation signature associated with the RIS 502. Therefore, the UE 120 may identify that the signal was reflected and/or redirected by the RIS 502. In some aspects, the UE 120 may decode the one or more signals based on decoding information provided by the base station 110 (e.g., via the configuration information). For example, a decoding method may be indicated to the UE 120 by the base station 110. In some other aspects, the decoding method may be defined (e.g., such that no signaling is required).

In some aspects, the UE 120 may measure (e.g., using antenna 252, DEMOD 254, MIMO detector 256, receive processor 258, controller/processor 280, and/or memory 282) the one or more signals (e.g., using an RIS reference signal). The UE 120 may measure one or more link parameters such as a link quality (e.g., an RSRQ), a signal strength (e.g., an RSRP), a signal-to-noise ratio (SNR), and/or other link parameters. In some other aspects, the UE 120 may not measure the one or more signals. The UE 120 may identify an RIS identifier (e.g., indicated by the modulation signature) associated with the one or more signals.

As shown by reference number 516, the UE 120 may transmit (e.g., using controller/processor 280, transmit processor 264, TX MIMO processor 266, MOD 254, antenna 252, and/or memory 282), and the base station 110 may receive (e.g., using antenna 234, DEMOD 232, MIMO detector 236, receive processor 238, controller/processor 240, and/or memory 242), a report. The report may be an RIS report. In some aspects, the report may indicate an identifier associated with the RIS 502 and/or one or more measurements of one or more signals transmitted via the link with the RIS 502, among other examples. In some aspects, the report may indicate whether the security enhancement described herein is to be activated. For example, in some aspects, the UE 120 may determine whether the measurement(s) of the one or more signals satisfy a threshold (e.g., a threshold indicated by the configuration information or a pre-defined threshold, such as a threshold defined, or otherwise fixed, by a wireless communication standard). If the measurement(s) satisfy the threshold, then the UE 120 may determine that the security enhancement described herein is to be activated. If the measurement(s) do not satisfy the threshold, then the UE 120 may determine that the security enhancement described herein is not to be activated.

The report may enable the base station 110 to determine (e.g., using controller/processor 240 and/or memory 242) whether the security enhancement described herein should be activated and/or applied. For example, the report may indicate whether the RIS link (e.g., associated with the RIS 502) has a suitable link quality to support the security enhancement. For example, if the security enhancement were to be used when the link quality is poor (e.g., does not satisfy a threshold), then the UE 120 may be unable to obtain or receive one or more security keys for the security enhancement. As a result, the UE 120 may be unable to authenticate PDSCH messages and/or may incorrectly determine that a PDSCH message is not authenticated. Therefore, enabling the security enhancement based at least in part on the link quality of the RIS link may ensure that the UE 120 is able to properly apply the security enhancement and/or authenticate PDSCH messages, as described in more detail elsewhere herein. For example, in some cases, the UE 120 may receive reflected signals from multiple RISs (e.g., with different identifiers), which may accumulate at the UE 120 and may be indistinguishable from each other. As another example, when a line-of-sight (LoS) path is a dominant path (e.g., is associated with a highest link parameter), the UE 120 may be unable to identify an RIS signature and/or a modulation signature. As a result, the UE 120 may be unable to receive and/or decode a modulation signature applied by the RIS 502 in some scenarios. The report transmitted by the UE 120 may enable the base station 110 to identify whether one of the scenarios (e.g., that prevents or reduces the UE's 120 ability to receive and/or decode a modulation signature applied by the RIS 502) is currently present.

As shown by reference number 518, the base station 110 may determine (e.g., using controller/processor 240 and/or memory 242) whether the security enhancement is to be used. The base station 110 may determine whether the security enhancement is to be used based at least in part on the report (e.g., the RIS report) transmitted by the UE 120. For example, the report may indicate one or more RIS identifiers. The base station 110 may measure and/or identify a measurement of an RIS link associated with an RIS identifier indicated by the report. For example, the base station 110 may measure and/or identify a measurement of an RIS link associated with the RIS 502. The base station 110 may determine whether the measurement of the RIS link (e.g., a measurement of a link quality of the RIS link) satisfies a threshold. If the measurement satisfies the threshold, then the base station 110 may determine that the security enhancement is to be used. If the measurement does not satisfy the threshold, then the base station 110 may determine that the security enhancement should not be used. In some aspects, as described above, the UE 120 may determine whether the RIS link is suitable for the security enhancement. The UE 120 may indicate, in the report, whether the RIS link is suitable for the security enhancement (e.g., as described in more detail elsewhere herein). In such examples, the base station 110 may determine whether the security enhancement is to be used based at least in part on the indication in the report from the UE 120.

As shown by reference number 520, the base station 110 may transmit (e.g., using controller/processor 240, transmit processor 220, TX MIMO processor 230, MOD 232, antenna 234, and/or memory 242), and the RIS 502 may receive (e.g., the RIS controller of the RIS 502 may receive) an indication of a first security key associated with the RIS 502. The first security key may be referred to herein as "S3." The first security key may be a security key that is to be added, using a modulation signature, to signals reflected or redirected by the RIS 502. As used herein, "security key" may refer to a unique key or code. For example, a security key may include a random sequence of numbers and/or letters, a hash key, an encryption key, an access security management entity (ASME) key, a sequence of bits, a specific waveform, and/or a PDCCH DMRS sequence, among other examples.

The base station 110 may configure the RIS 502 with the first security key based at least in part on determining that the security enhancement is to be used, as described in more detail elsewhere herein. For example, the base station 110 may determine that the security enhancement is to be used based at least in part on the report transmitted by the UE 120. The base station 110 may transmit, to the RIS 502, an indication of the first security key to cause the RIS 502 to insert the first security key into one or more signals using a modulation signature. In some aspects, the first security key may be based at least in part on an identifier associated with the RIS 502. For example, the base station 110 may determine and/or generate the first security key using the identifier associated with the RIS 502.

In some aspects, the base station 110 may indicate one or more beams and/or a spatial direction for which the RIS 502 is to insert the first security key. For example, the one or more beams and/or the spatial direction may be associated with (e.g., may be toward) the UE 120. The base station 110 may indicate that the RIS 502 is to insert the first security key (e.g., using modulation) into signals reflected and/or redirected in the direction of the one or more beams and/or the spatial direction associated with the UE 120. In other words, the RIS 502 may be configured to insert the first security key for signals associated with some beams and/or spatial directions and may be configured to not insert the first security key for signals associated with other beams and/or spatial directions.

As shown by reference number 522, the base station 110 may transmit (e.g., using controller/processor 240, transmit processor 220, TX MIMO processor 230, MOD 232, antenna 234, and/or memory 242) a control message (e.g., a signal associated with a downlink control channel), such as a PDCCH message (e.g., a message transmitted via the PDCCH). The base station 110 may transmit the control message using a beam associated with, or in a spatial direction toward, the RIS 502. The control message may include a second security key. For example, the second security key may be included in a payload of the control message. The second security key may be referred to herein as "S1." The base station 110 may determine the second security key. In some aspects, the base station 110 may transmit the control message to the UE 120 using a direct link (e.g., without using the RIS 502). In some other aspects, the control message may be redirected and/or reflected toward the UE 120 by the RIS 502. The control message may be a message that schedules one or more PDSCH messages.

In some aspects, as shown by reference number 524, the RIS 502 may modulate the signal (e.g., the signal associated with the control message) using a modulation signature to insert the first security key. For example, the RIS 502 may insert the first security key into a PDCCH signal. For example, the signal may be reflected or redirected by the RIS 502 to the UE 120. The RIS 502 may modulate the signal (e.g., the impinging signal that arrives at the RIS 502) using the modulation signature. The RIS 502 may modulate the signal based at least in part on the signal being associated with a beam and/or spatial direction toward the UE 120. For example, the RIS 502 may be configured (e.g., by the base station 110) to modulate signals (e.g., PDCCH signals and/or other signals) that are to be redirected and/or reflected toward the UE 120 (e.g., to insert the first security key and to enable the security enhancement described herein).

For example, the RIS 502 may modulate a phase of the signal (e.g., for a phase modulation signature), may modulate a polarization of the signal (e.g., for a polarization modulation signature), and/or may modulate an amplitude of the signal (e.g., for an amplitude modulation signature). For example, for a phase modulation signature and/or a polarization modulation signature, the RIS 502 may modulate the signal in symbols of the signal that include a reference signal (e.g., a DMRS, a PTRS, and/or a polarization detection reference signal). For a polarization modulation signature, the RIS 502 may modulate a polarization state of the signal from a first polarization state of the signal as transmitted by the base station 110 to a second polarization state of the signal. For an amplitude modulation signature, the RIS 502 may modulate the amplitude of the signal by attenuating the amplitude of the signal in accordance with a pattern (e.g., the amplitude modulation signature) that identifies the first security key. The RIS 502 may modulate the amplitude of the signal by puncturing the signal at one or more symbols of the signal, and/or by modulating a spatial direction of the signal. In some aspects, the RIS 502 may use a modulation signature that identifies the first security key and identifies the RIS 502. In some aspects, the signal modulated by the RIS 502 using the modulation signature may be a signal associated with the control message (e.g., that includes the second security key in the payload of the control message) and/or may be a signal associated with another PDCCH message.

As shown by reference number 526, the UE 120 may receive (e.g., using antenna 252, DEMOD 254, MIMO detector 256, receive processor 258, controller/processor 280, and/or memory 282) the control message that includes the second security key. In some aspects, the signal of the control message may be modulated using the modulation signature that identifies the first security key. In some aspects, the control message that includes the second security key may not be modulated by the RIS 502 and/or may be transmitted via a direct link between the UE 120 and the base station 110. In such examples, the UE 120 may receive another signal (e.g., another PDCCH signal) that is modulated using the modulation signature.

The UE 120 may receive the control message and/or the other message (e.g., using antenna 252, DEMOD 254, MIMO detector 256, receive processor 258, controller/processor 280, and/or memory 282) to obtain the first security key and the second security key. For example, the UE 120 may decode the control message to identify the second security key in the payload of the control message. Similarly, the UE 120 may decode the signal modulated by the RIS 502 to identify the modulation signature. The UE 120 may determine the first security key based at least in part on the modulation signature (e.g., the modulation signature may include a pattern or sequence that identifies the first security key). The first security key and the second security key may be used when decoding data scheduled by the control message. For example, the data may be broadcast information or other signaling. The UE 120 may use the first security key and the second security key to decode and authenticate the data, as described in more detail elsewhere herein.

As shown by reference number 528, the base station 110 may transmit (e.g., using controller/processor 240, transmit processor 220, TX MIMO processor 230, MOD 232, antenna 234, and/or memory 242) another signal (e.g., a second signal) that includes a third security key. The third security key may be referred to herein as "S2." The signal that includes the third security key may be a data signal and/or a PDSCH signal. For example, the signal that includes the third security key may be associated with broadcast signaling, SIB signaling, MAC signaling, and/or paging signaling, among other examples. In some aspects, the base station 110 may determine the third security key. For example, the base station 110 may determine the third security key based at least in part on the first security key and the second security key. In some aspects, the base station 110 may determine the third security key to be the output of an authentication function when the first security key and the second security key are provided as inputs to the authentication function.

In some aspects, the second security key and/or the third security key may be based at least in part on a fourth security key. The fourth security key may be referred to herein as "S0." The fourth security key may be a security key associated with another type of signaling. For example, the fourth security key may be an access security key. The fourth security key may be associated with UE-specific data security (e.g., ciphering and integrity protection) and/or MAC signaling security, among other examples. For example, the fourth security key may be established and/or generated as part of a connection establishment procedure between the UE 120 and the base station 110. For example, the base station 110 may transmit, and the UE 120 may receive, an indication of the fourth security key (e.g., as part of the connection establishment procedure). In some aspects, the second security key (e.g., the security key included in the PDCCH signal or the control signal) may be derived from S0 and S1 (e.g., may be derived from the key established between the UE 120 and the base station and a random security key). In some other aspects, the second security key may be a random security key and may not be based at least in part on S0. In some aspects, the third security key (e.g., the security key included in the PDSCH signal) may be derived as a function of S0 and/or S2. In some aspects, at least one of the second security key or the third security key may be based at least in part on S0 (e.g., at least one of the second security key or the third security key may be a function of S0).

In some aspects, as shown by reference number 530, the RIS 502 may reflect and/or redirect the signal (e.g., the PDSCH signal and/or the signal that includes the third security key in a payload of the third signal) toward the UE 120. For example, the RIS 502 may redirect the signal using a beam and/or spatial direction associated with the UE 120. In some aspects, the RIS 502 may modulate the signal to insert the modulation signature (e.g., in a similar manner as described above). In some other aspects, the RIS 502 may not modulate the signal (e.g., the PDSCH signal and/or the signal that includes the third security key in a payload of the third signal). In some aspects, the signal may be transmitted via a direct link between the UE 120 and the base station 110 (e.g., via a link that does not include the RIS 502).

As shown by reference number 532, the UE 120 may authenticate the signal based at least in part on the first security key, the second security key, and the third security key (e.g., using controller/processor 280 and/or memory 282). For example, the UE 120 may receive and decode the signal to obtain the third security key. The UE 120 may generate, using an authentication function, an authentication key based at least in part on the first security key and the second security key. In some aspects, the authentication function may be or may include a one-way function, a key derivation function, a secure hash function, or another suitable function. In some aspects, the authentication function may include a process, algorithm, mathematical transform, or another operation or series of operations, which may be provisioned in the UE 120 (e.g., by the base station 110). In some embodiments, the base station 110 may statically provision the UE 120 with the authentication function. In some other aspects, the base station 110 may provision the UE 120 with the authentication function dynamically. For example, the base station 110 may change or provide a new authentication function to the UE 120 from time to time.

The UE 120 may authenticate the signal based at least in part on whether the authentication key matches the third security key. For example, if the authentication key matches the third security key, then the UE 120 may determine that the signal (e.g., that includes the third security key in the payload) is authentic. If the authentication key does not match the third security key, then the UE 120 may determine that the signal (e.g., that includes the third security key in the payload) is fake and/or fabricated (e.g., not authentic). For example, the UE 120 may perform a matching operation to determine whether the authentication key matches the third security key. For example, the matching operation may be expressed as $S2=f_a(S1, S3)$, where $f_a()$ is the authentication function. In some aspects, such as where at least one of the second security key or the third security key is based at least in part on S0, the matching operation may be expressed as $S2=f_a(S0, S1, S3)$.

If the UE 120 determines that the signal is authentic (e.g., based at least in part on the matching operation), then the UE 120 may enable communications with the base station 110. If the UE 120 determines that the signal is not authentic (e.g., based at least in part on the matching operation), then the UE 120 may disable or block communications with the base station 110. This may improve a security associated with the PDSCH signaling because the UE 120 is enabled to determine when signals transmitted via the PDSCH are authentic. As a result, a security associated with signals redirected by the RIS 502 may be improved. For example, the UE 120 may be enabled to identify fake and/or fabricated transmissions associated with the RIS 502 and may be enabled to block or not receive further communications from the device that transmitted the fake and/or fabricated transmissions. Some techniques and apparatus described herein enable improved security for MAC signaling, broadcast signaling, and/or paging signaling associated with an RIS 502.

As indicated above, FIG. 5 is provided as an example. Other examples may differ from what is described with respect to FIG. 5.

Figure 6:
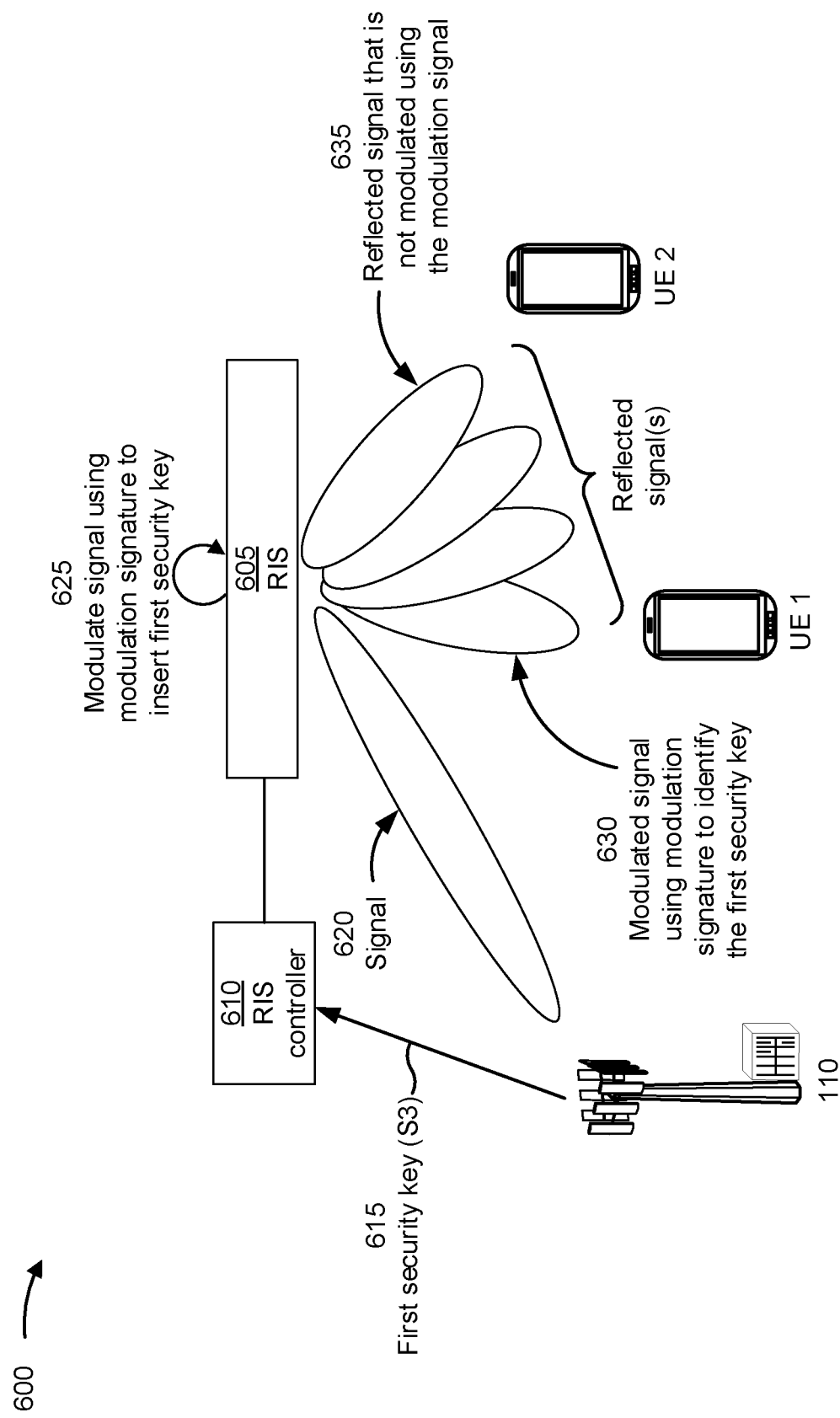

FIG. 6 is a diagram illustrating an example 600 associated with security enhancements with an RIS, in accordance with the present disclosure. As shown in FIG. 6, a base station 110 may communicate with one or more UEs 120 (e.g., UE1 and UE2) in a wireless network, such as the wireless network 100. The base station 110 and the UEs 120 may use an RIS 605 to communicate with one another. For example, the RIS 605 may reflect or redirect a signal to the base station 110 and/or the UEs 120. The RIS 605 may be the same as, or similar to, the RIS 502 described in connection with FIG. 5. The reconfigurable elements of the RIS 605 may be controlled and/or configured by an RIS controller 610. The RIS controller 610 may be a control module (e.g., a controller and/or a processor) that is capable of configuring the electromagnetic characteristic(s) of each reconfigurable element of the RIS 605 (e.g., in a similar manner as described in connection with FIG. 3).

As shown by reference number 615, the base station 110 may transmit, and the RIS 605 and/or the RIS controller 610 may receive, an indication of the first security key (e.g., S3), in a similar manner as described in connection with FIG. 5. For example, the base station 110 and/or the UE 1 may determine that the security enhancement described herein is to be used. Therefore, the base station 110 may configure the RIS 605 to insert the first security key into signals reflected and/or redirected toward the UE 1.

The base station 110 may transmit a signal 620. The signal 620 may be transmitted in a spatial direction toward the RIS 605. The RIS 605 may configure the reconfigurable elements of the RIS 605 to reflect and/or redirect the signal 620 in a desired spatial direction and/or with one or more desired signal characteristics (e.g., beam width, phase, amplitude, frequency, and/or polarization). Additionally, as shown by reference number 625, the RIS 605 may modulate the signal 620 (e.g., in phase, polarization state, and/or amplitude). For example, the RIS 605 may modulate the signal 620 using a modulation signature to insert the first security key (e.g., S3) into a signal reflected and/or redirected by the RIS 605. The RIS 605 may modulate the signal 620 using the modulation signature in a similar manner as described in connection with FIG. 5.

Although multiple beams are shown in FIG. 6 representing different beam states or beam directions of the RIS 605, the RIS 605 may be capable of reflecting a signal with one beam state or one beam direction at a time. For example, in one case, as shown by reference number 630, the RIS 305 may be configured to reflect the signal 620 using a first beam state (e.g., beam state 1). The first beam state may cause the signal 620 to be reflected in a spatial direction toward a first UE 120 (e.g., UE 1). The reflected signal may be a modulated signal (e.g., modulated in accordance with the modulation signature) to identify the first security key. For example, the security enhancements described herein may be enabled or activated for the UE 1. Therefore, the RIS 605 may modulate the reflected signal to insert the first security key into the reflected signal. This may enable the UE 1 to receive and decode the reflected signal to obtain the first security key. The UE 1 may use the first security key (and/or additional security keys, as described in more detail elsewhere herein) to authenticate future messages transmitted by the base station 110, as described in more detail in connection with FIG. 5.

As shown by reference number 635, in another case, the RIS 605 may be configured to reflect the signal 620 using a second beam state (e.g., beam state 2). The first beam state may cause the signal 620 to be reflected in a spatial direction toward a second UE 120 (e.g., UE 2). In some aspects, the security enhancements described herein may not be enabled and/or may not be activated for the UE 2. Therefore, as shown in FIG. 6, the RIS 605 may reflect the signal 620 toward the UE 2 without modulating the signal 620. In this way, the UE 2 may be enabled to decode the reflected signal. This provides additional flexibility for the base station 110 to enable the security enhancement for some UEs and to disable the security enhancement for other UEs (e.g., based at least in part on RIS link qualities associated with the different UEs).

As indicated above, FIG. 6 is provided as an example. Other examples may differ from what is described with respect to FIG. 6.

Figure 7:
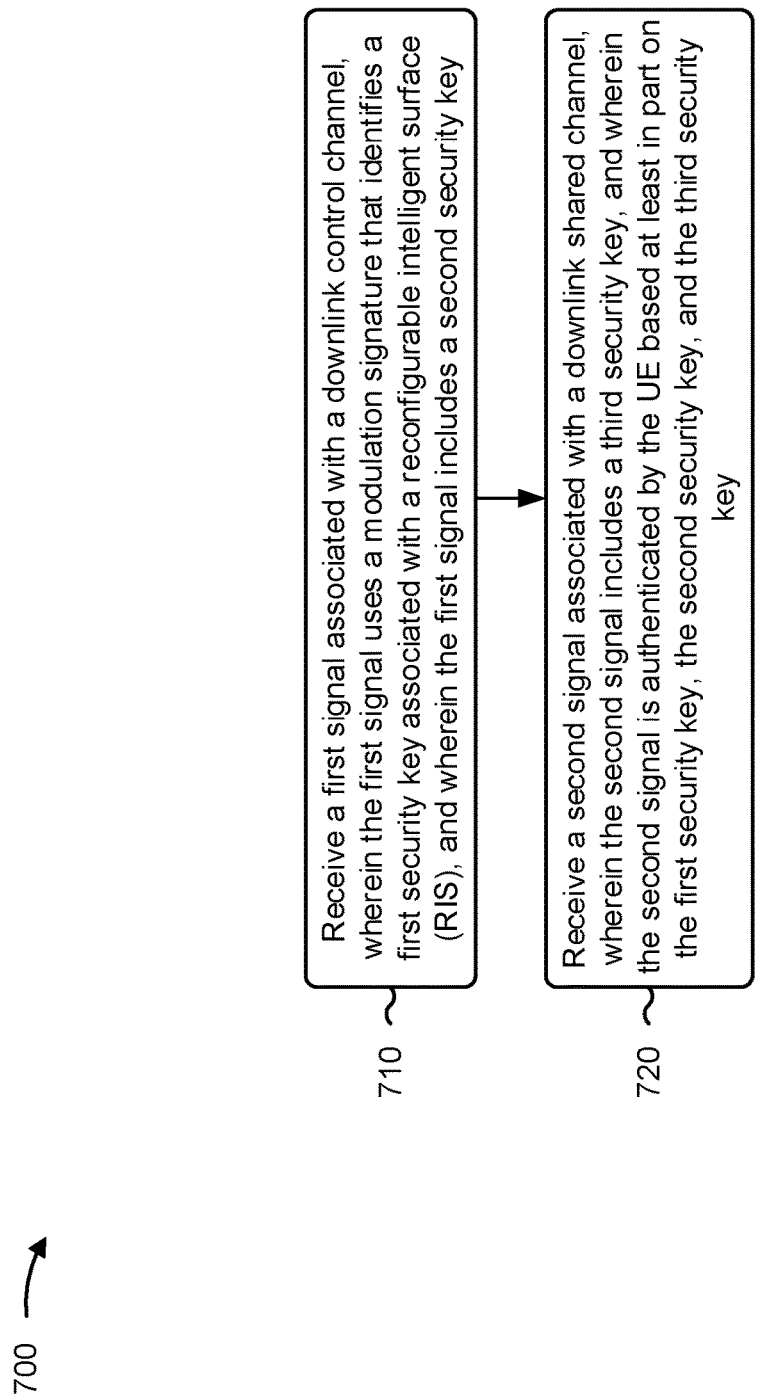
FIGS. 7-10 are diagrams illustrating example processes associated with security enhancements with an RIS, in accordance with the present disclosure.

FIG. 7 is a diagram illustrating an example process 700 performed, for example, by a UE, in accordance with the present disclosure. Example process 700 is an example where the UE (e.g., UE 120) performs operations associated with security enhancements with an RIS.

As shown in FIG. 7, in some aspects, process 700 may include receiving a first signal associated with a downlink control channel, wherein the first signal uses a modulation signature that identifies a first security key associated with an RIS, and wherein the first signal includes a second security key (block 710). For example, the UE (e.g., using communication manager 140 and/or reception component 1102, depicted in FIG. 11) may receive a first signal associated with a downlink control channel, wherein the first signal uses a modulation signature that identifies a first security key associated with an RIS, and wherein the first signal includes a second security key, as described above.

As further shown in FIG. 7, in some aspects, process 700 may include receiving a second signal associated with a downlink shared channel, wherein the second signal includes a third security key, and wherein the second signal is authenticated by the UE based at least in part on the first security key, the second security key, and the third security key (block 720). For example, the UE (e.g., using communication manager 140 and/or reception component 1102, depicted in FIG. 11) may receive a second signal associated with a downlink shared channel, wherein the second signal includes a third security key, and wherein the second signal is authenticated by the UE based at least in part on the first security key, the second security key, and the third security key, as described above.

Process 700 may include additional aspects, such as any single aspect or any combination of aspects described below and/or in connection with one or more other processes described elsewhere herein.

In a first aspect, process 700 includes decoding the second signal to authenticate the second signal using the first security key, the second security key, and the third security key.

In a second aspect, alone or in combination with the first aspect, decoding the second signal to authenticate the second signal includes generating, using an authentication function, an authentication key based at least in part on the first security key and the second security key, and authenticating the second signal based at least in part on whether the authentication key matches the third security key.

In a third aspect, alone or in combination with one or more of the first and second aspects, process 700 includes transmitting, to a base station, a report for a link associated with the RIS, wherein the report indicates at least one of an identifier associated with the RIS and one or more measurements of one or more signals transmitted via the link, and wherein the first signal using the modulation signature that identifies the first security key is based at least in part on the report.

In a fourth aspect, alone or in combination with one or more of the first through third aspects, process 700 includes measuring the one or more signals transmitted via the link using an RIS reference signal associated with the one or more signals to obtain the one or more measurements.

In a fifth aspect, alone or in combination with one or more of the first through fourth aspects, the first signal using the modulation signature that identifies the first security key is based at least in part on the one or more measurements satisfying a threshold.

In a sixth aspect, alone or in combination with one or more of the first through fifth aspects, the report includes an indication of whether the one or more measurements satisfy a threshold, and the first signal using the modulation signature that identifies the first security key is based at least in part on whether the one or more measurements satisfy the threshold.

In a seventh aspect, alone or in combination with one or more of the first through sixth aspects, the modulation signature is at least one of a phase modulation signature, a polarization modulation signature, or an amplitude modulation signature.

In an eighth aspect, alone or in combination with one or more of the first through seventh aspects, the first security key is based at least in part on an identifier associated with the RIS.

In a ninth aspect, alone or in combination with one or more of the first through eighth aspects, the modulation signature further identifies an identifier associated with the RIS.

In a tenth aspect, alone or in combination with one or more of the first through ninth aspects, process 700 includes receiving, from a base station, an indication of a fourth security key, wherein at least one of the second security key or the third security key is based at least in part on the fourth security key.

In an eleventh aspect, alone or in combination with one or more of the first through tenth aspects, receiving the indication of the fourth security key includes receiving, from the base station, the indication of the fourth security key as part of a connection establishment procedure with the base station.

In a twelfth aspect, alone or in combination with one or more of the first through eleventh aspects, the fourth security key is associated with at least one of UE-specific data security or medium access control signaling security.

In a thirteenth aspect, alone or in combination with one or more of the first through twelfth aspects, the first signal using the modulation signature that identifies the first security key is based at least in part on the first signal being associated with a beam state or a spatial direction that is associated with the UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
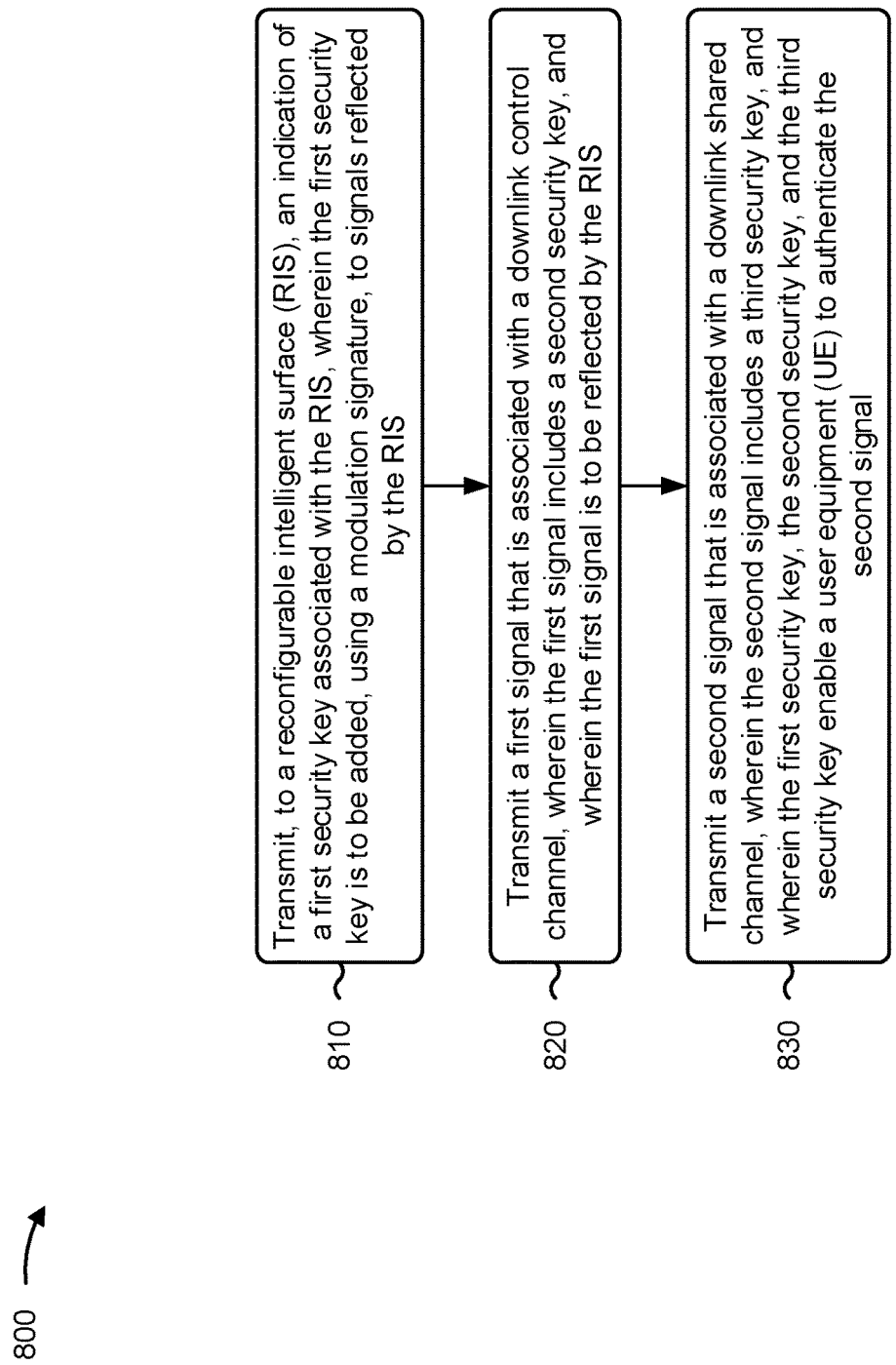

FIG. 8 is a diagram illustrating an example process 800 performed, for example, by a base station, in accordance with the present disclosure. Example process 800 is an example where the base station (e.g., base station 110) performs operations associated with security enhancements with an RIS.

As shown in FIG. 8, in some aspects, process 800 may include transmitting, to an RIS, an indication of a first security key associated with the RIS, wherein the first security key is to be added, using a modulation signature, to signals reflected by the RIS (block 810). For example, the base station (e.g., using communication manager 150 and/or transmission component 1204, depicted in FIG. 12) may transmit, to an RIS, an indication of a first security key associated with the RIS, wherein the first security key is to be added, using a modulation signature, to signals reflected by the RIS, as described above.

As further shown in FIG. 8, in some aspects, process 800 may include transmitting a first signal that is associated with a downlink control channel, wherein the first signal includes a second security key, and wherein the first signal is to be reflected by the RIS (block 820). For example, the base station (e.g., using communication manager 150 and/or transmission component 1204, depicted in FIG. 12) may transmit a first signal that is associated with a downlink control channel, wherein the first signal includes a second security key, and wherein the first signal is to be reflected by the RIS, as described above.

As further shown in FIG. 8, in some aspects, process 800 may include transmitting a second signal that is associated with a downlink shared channel, wherein the second signal includes a third security key, and wherein the first security key, the second security key, and the third security key enable a user equipment (UE) to authenticate the second signal (block 830). For example, the base station (e.g., using communication manager 150 and/or transmission component 1204, depicted in FIG. 12) may transmit a second signal that is associated with a downlink shared channel, wherein the second signal includes a third security key, and wherein the first security key, the second security key, and the third security key enable a UE to authenticate the second signal, as described above.

Process 800 may include additional aspects, such as any single aspect or any combination of aspects described below and/or in connection with one or more other processes described elsewhere herein.

In a first aspect, process 800 includes receiving, from the UE, a report for a link associated with the RIS, wherein the report indicates at least one of an identifier associated with the RIS and one or more measurements of one or more signals transmitted via the link, and wherein transmitting, to the RIS, the indication of the first security key is based at least in part on the report.

In a second aspect, alone or in combination with the first aspect, process 800 includes identifying a link quality associated with the link based at least in part on the one or more measurements.

In a third aspect, alone or in combination with one or more of the first and second aspects, transmitting, to the RIS, the indication of the first security key is based at least in part on the one or more measurements satisfying a threshold.

In a fourth aspect, alone or in combination with one or more of the first through third aspects, the report includes an indication of whether the one or more measurements satisfy a threshold, and transmitting, to the RIS, the indication of the first security key is based at least in part on whether the one or more measurements satisfy the threshold.

In a fifth aspect, alone or in combination with one or more of the first through fourth aspects, the modulation signature is at least one of a phase modulation signature, a polarization modulation signature, or an amplitude modulation signature.

In a sixth aspect, alone or in combination with one or more of the first through fifth aspects, the first security key is based at least in part on an identifier associated with the RIS.

In a seventh aspect, alone or in combination with one or more of the first through sixth aspects, process 800 includes transmitting, to the UE, an indication of a fourth security key, wherein at least one of the second security key or the third security key is based at least in part on the fourth security key.

In an eighth aspect, alone or in combination with one or more of the first through seventh aspects, transmitting the indication of the fourth security key includes transmitting, to the UE, the indication of the fourth security key as part of a connection establishment procedure with the UE.

In a ninth aspect, alone or in combination with one or more of the first through eighth aspects, the fourth security key is associated with at least one of UE-specific data security or medium access control signaling security.

In a tenth aspect, alone or in combination with one or more of the first through ninth aspects, transmitting, to the RIS, the indication of the first security key includes transmitting an indication of a beam state or a spatial direction to which the first security key is to be added by the RIS.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
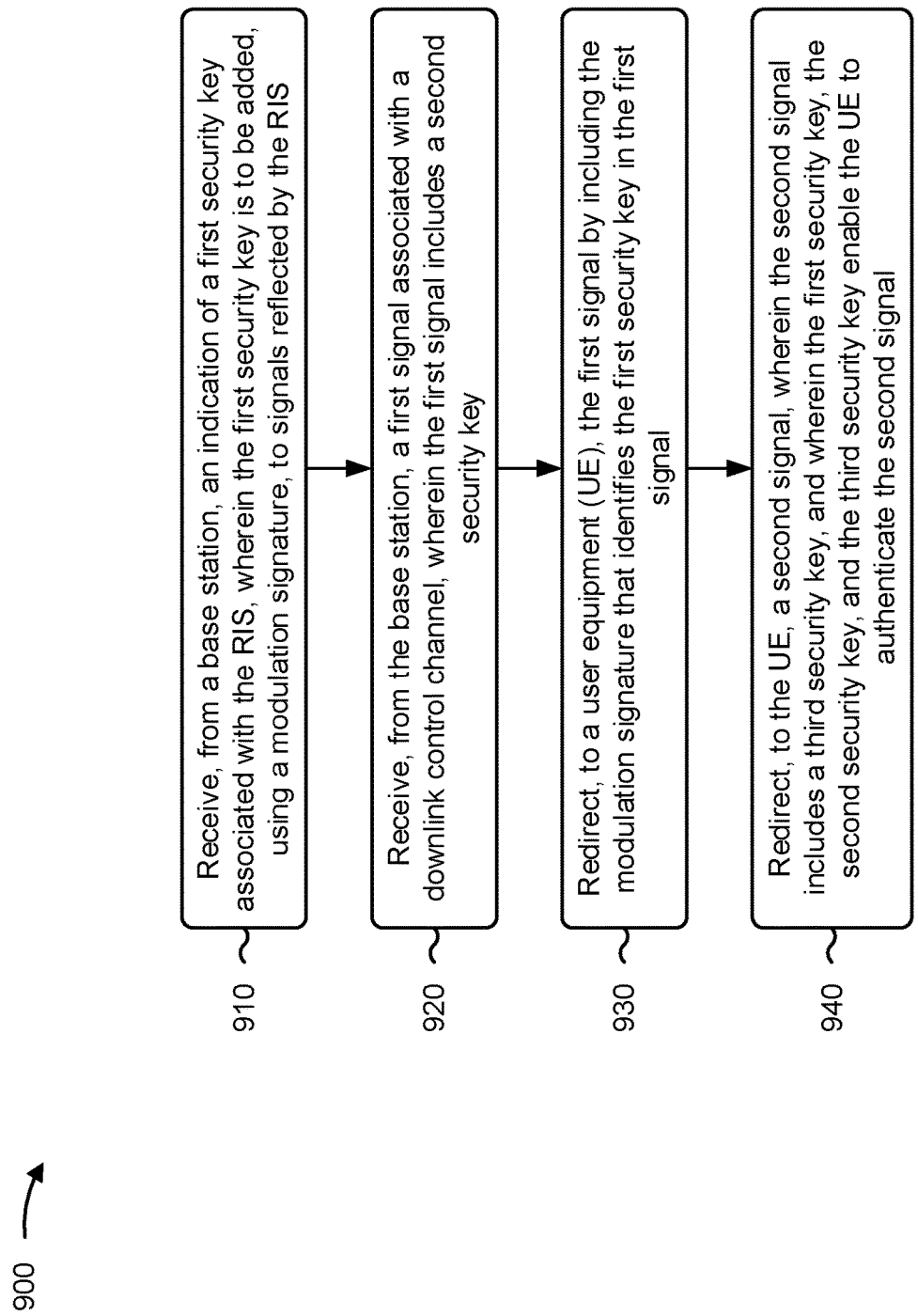

FIG. 9 is a diagram illustrating an example process 900 performed, for example, by an RIS, in accordance with the present disclosure. Example process 900 is an example where the RIS (e.g., RIS 160, RIS 502, and/or RIS 605) performs operations associated with security enhancements with an RIS.

As shown in FIG. 9, in some aspects, process 900 may include receiving, from a base station, an indication of a first security key associated with the RIS, wherein the first security key is to be added, using a modulation signature, to signals reflected by the RIS (block 910). For example, the RIS (e.g., using communication manager 170 and/or reception component 1302, depicted in FIG. 13) may receive, from a base station, an indication of a first security key associated with the RIS, wherein the first security key is to be added, using a modulation signature, to signals reflected by the RIS, as described above.

As further shown in FIG. 9, in some aspects, process 900 may include receiving, from the base station, a first signal associated with a downlink control channel, wherein the first signal includes a second security key (block 920). For example, the RIS (e.g., using communication manager 170 and/or reception component 1302, depicted in FIG. 13) may receive, from the base station, a first signal associated with a downlink control channel, wherein the first signal includes a second security key, as described above.

As further shown in FIG. 9, in some aspects, process 900 may include redirecting, to a UE, the first signal by including the modulation signature that identifies the first security key in the first signal (block 930). For example, the RIS (e.g., using communication manager 170 and/or redirection component 1308, depicted in FIG. 13) may redirect, to a UE, the first signal by including the modulation signature that identifies the first security key in the first signal, as described above.

As further shown in FIG. 9, in some aspects, process 900 may include redirecting, to the UE, a second signal, wherein the second signal includes a third security key, and wherein the first security key, the second security key, and the third security key enable the UE to authenticate the second signal (block 940). For example, the RIS (e.g., using communication manager 170 and/or redirection component 1308, depicted in FIG. 13) may redirect, to the UE, a second signal, wherein the second signal includes a third security key, and wherein the first security key, the second security key, and the third security key enable the UE to authenticate the second signal, as described above.

Process 900 may include additional aspects, such as any single aspect or any combination of aspects described below and/or in connection with one or more other processes described elsewhere herein.

In a first aspect, the modulation signature is at least one of a phase modulation signature, a polarization modulation signature, or an amplitude modulation signature.

In a second aspect, alone or in combination with the first aspect, the modulation signature is a polarization modulation signature, and redirecting the first signal includes modulating a polarization state of the first signal from a first polarization state of the first signal as transmitted by the base station to a second polarization state of the first signal, wherein the polarization state includes an angle of polarization or a polarization mode.

In a third aspect, alone or in combination with one or more of the first and second aspects, the modulation signature identifies the first security key and an identifier associated with the RIS.

In a fourth aspect, alone or in combination with one or more of the first through third aspects, the first security key is based at least in part on an identifier associated with the RIS.

In a fifth aspect, alone or in combination with one or more of the first through fourth aspects, at least one of the second security key or the third security key is based at least in part on a fourth security key.

In a sixth aspect, alone or in combination with one or more of the first through fifth aspects, the fourth security key is established as part on a connection establishment procedure between the base station and the UE.

In a seventh aspect, alone or in combination with one or more of the first through sixth aspects, redirecting the first signal including the modulation signature is based at least in part on a quality of a link between the RIS and the UE satisfying a threshold.

In an eighth aspect, alone or in combination with one or more of the first through seventh aspects, receiving the indication of the first security key includes receiving an indication of a beam state or a spatial direction to which the first security key is to be added by the RIS, and redirecting the first signal by including the modulation signature that identifies the first security key in the first signal is based at least in part on the first signal being redirected using the beam state or the spatial direction.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
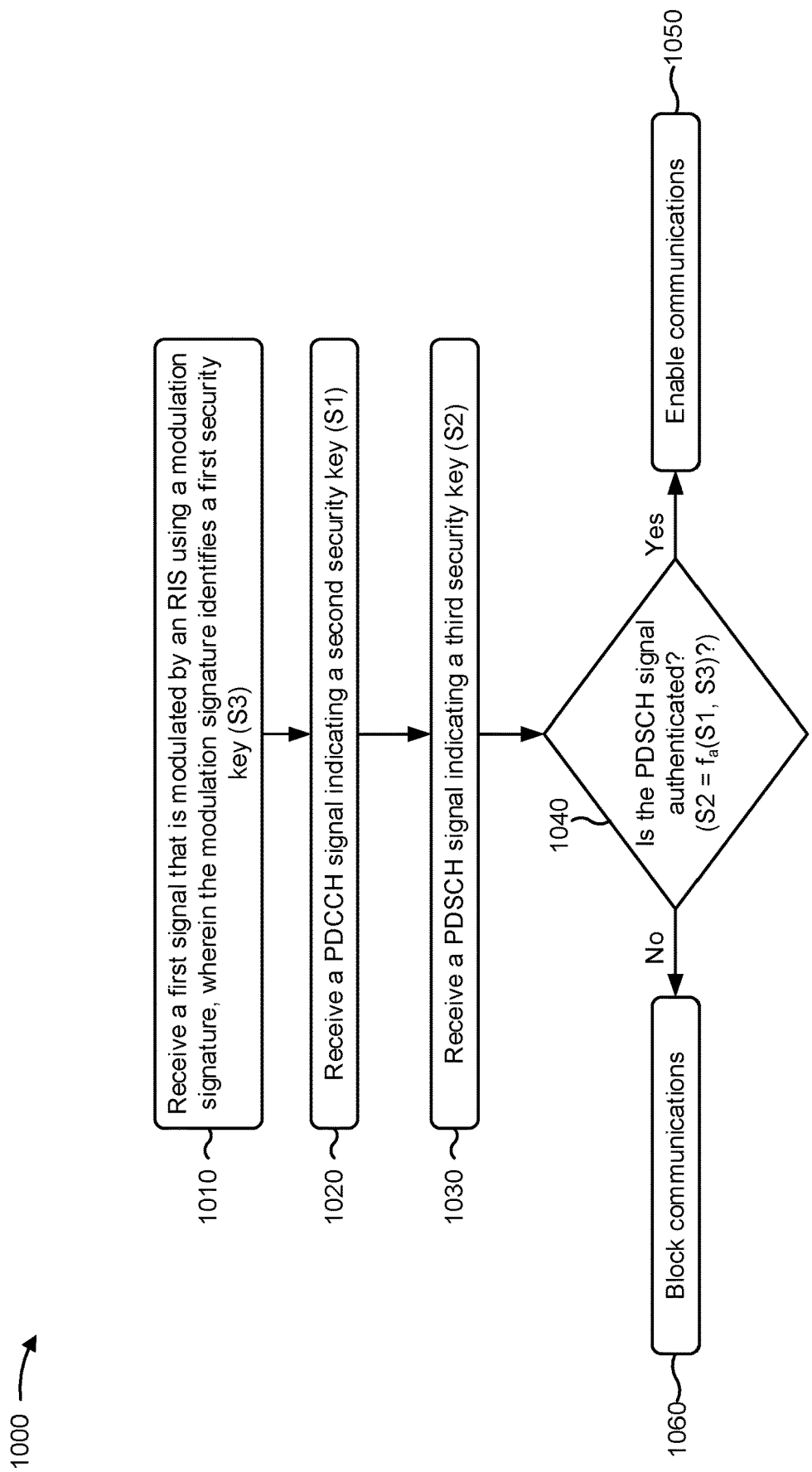

FIG. 10 is a diagram illustrating an example process 1000 performed, for example, by a UE, in accordance with the present disclosure. Example process 1000 is an example where the UE (e.g., UE 120) performs operations associated with security enhancements with an RIS.

As shown in FIG. 10, in some aspects, process 1000 may include receiving a first signal that is modulated by an RIS using a modulation signature, wherein the modulation signature identifies a first security key (e.g., S3) (block 1010). For example, the UE (e.g., using communication manager 140 and/or reception component 1102, depicted in FIG. 11) may receive a first signal that is modulated by an RIS using a modulation signature, wherein the modulation signature identifies a first security key, as described above. The modulation signature may be a phase modulation signature, a polarization modulation signature, and/or an amplitude modulation signature, among other examples.

As shown in FIG. 10, in some aspects, process 1000 may include receiving a PDCCH signal indicating a second security key (e.g., S1) (block 1020). For example, the UE (e.g., using communication manager 140 and/or reception component 1102, depicted in FIG. 11) may receive a PDCCH signal indicating a second security key (e.g., S1), as described above. In some aspects, the PDCCH signal may be the first signal. In some aspects, the PDCCH signal may indicate the second security key (S1) in a payload of the PDCCH signal. In some aspects, the PDCCH signal may schedule a PDSCH signal.

As shown in FIG. 10, in some aspects, process 1000 may include receiving a PDSCH signal indicating a third security key (e.g., S2) (block 1030). For example, the UE (e.g., using communication manager 140 and/or reception component 1102, depicted in FIG. 11) may receive a PDSCH signal indicating a third security key (e.g., S2), as described above. The PDSCH signal may indicate the third security key in a payload of the PDSCH signal. In some aspects, the PDSCH signal may be scheduled by the PDCCH signal.

As shown in FIG. 10, in some aspects, process 1000 may include determining whether the PDSCH signal is authenticated (block 1040). For example, the UE (e.g., using communication manager 140 and/or signal authentication component 1108, depicted in FIG. 11) may determine whether the PDSCH signal is authenticated, as described above. For example, the UE may authenticate the PDSCH signal based at least in part on the first security key, the second security key, and the third security key.

In some aspects, the UE may generate, using an authentication function, an authentication key (e.g., $f_a(\ )$) based at least in part on the first security key and the second security key. The UE 120 may determine whether the PDSCH signal is authenticated based at least in part on whether the authentication key matches the third security key (e.g., whether $S2=f_a(S1, S3)$).

As shown in FIG. 10, in some aspects, if the UE determines that the PDSCH signal is authenticated, then process 1000 may include enabling communications with a device that transmitted the PDSCH signal (block 1050). For example, the UE (e.g., using communication manager 140 and/or signal authentication component 1108, depicted in FIG. 11) may enable communications with a device that transmitted the PDSCH signal, as described above.

As shown in FIG. 10, in some aspects, if the UE determines that the PDSCH signal is not authenticated, then process 1000 may include blocking communications with a device that transmitted the PDSCH signal (block 1060). For example, the UE (e.g., using communication manager 140 and/or signal authentication component 1108, depicted in FIG. 11) may block communications with a device that transmitted the PDSCH signal, as described above. For example, the UE may prevent or refrain from receiving future communications from the device if the PDSCH signal is not authenticated.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
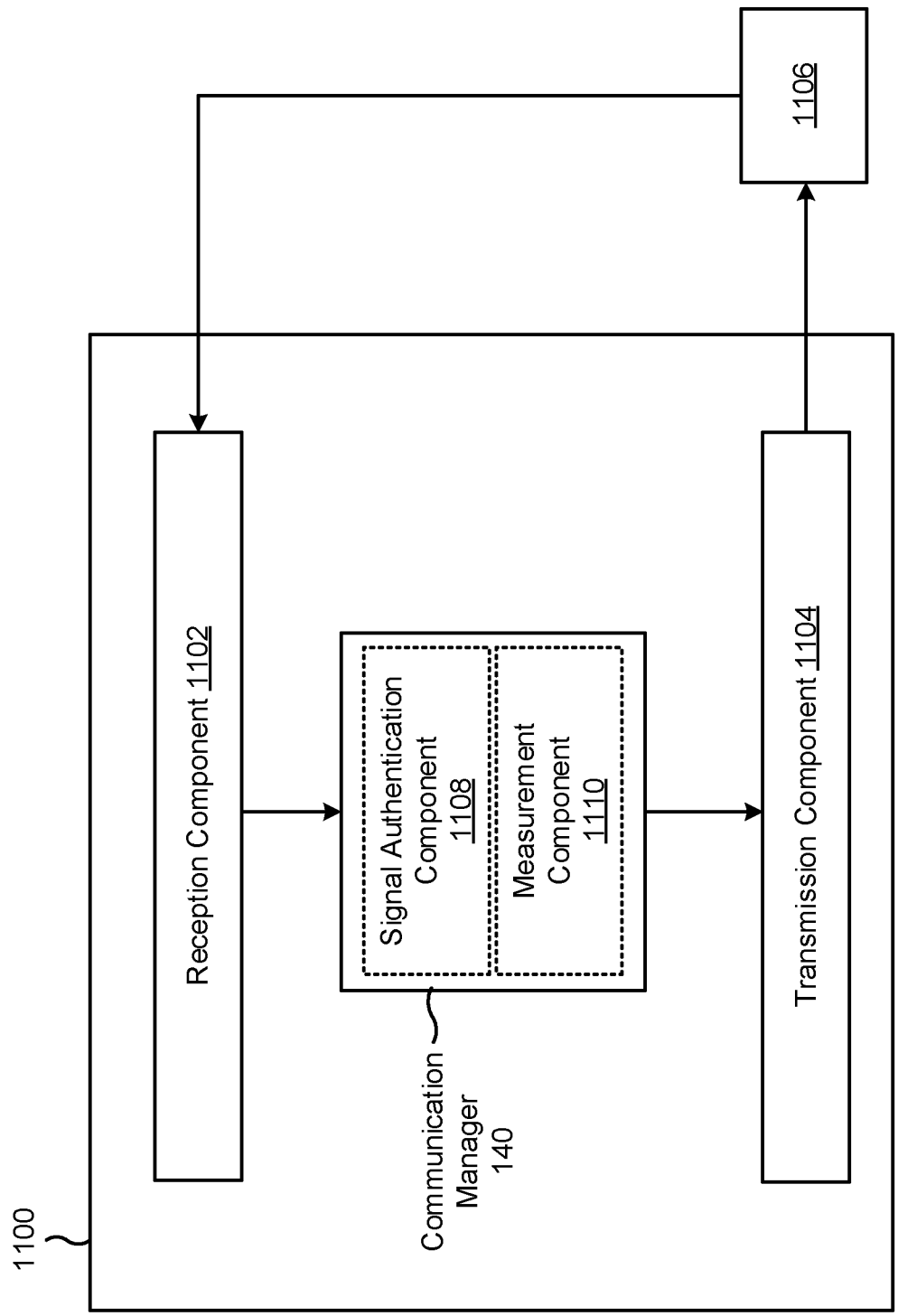
FIGS. 11-13 are diagrams of example apparatuses for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of a signal authentication component 1108, and/or a measurement component 1110, among other examples.

In some aspects, the apparatus 1100 may be configured to perform one or more operations described herein in connection with FIGS. 5-6. Additionally, or alternatively, the apparatus 1100 may be configured to perform one or more processes described herein, such as process 700 of FIG. 7 and/or process 1000 of FIG. 10, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive a first signal associated with a downlink control channel, wherein the first signal uses a modulation signature that identifies a first security key associated with an RIS, and wherein the first signal includes a second security key. The reception component 1102 may receive a second signal associated with a downlink shared channel, wherein the second signal includes a third security key, and wherein the second signal is authenticated by the UE based at least in part on the first security key, the second security key, and the third security key.

The signal authentication component 1108 may decode the second signal to authenticate the second signal using the first security key, the second security key, and the third security key. The signal authentication component 1108 may generate, using an authentication function, an authentication key based at least in part on the first security key and the second security key. The signal authentication component 1108 may authenticate the second signal based at least in part on whether the authentication key matches the third security key.

The transmission component 1104 may transmit, to a base station, a report for a link associated with the RIS, wherein the report indicates at least one of an identifier associated with the RIS and one or more measurements of one or more signals transmitted via the link, wherein the first signal using the modulation signature that identifies the first security key is based at least in part on the report.

The measurement component 1110 may measure the one or more signals transmitted via the link using an RIS reference signal associated with the one or more signals to obtain the one or more measurements.

The reception component 1102 may receive, from a base station, an indication of a fourth security key, wherein at least one of the second security key or the third security key is based at least in part on the fourth security key.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
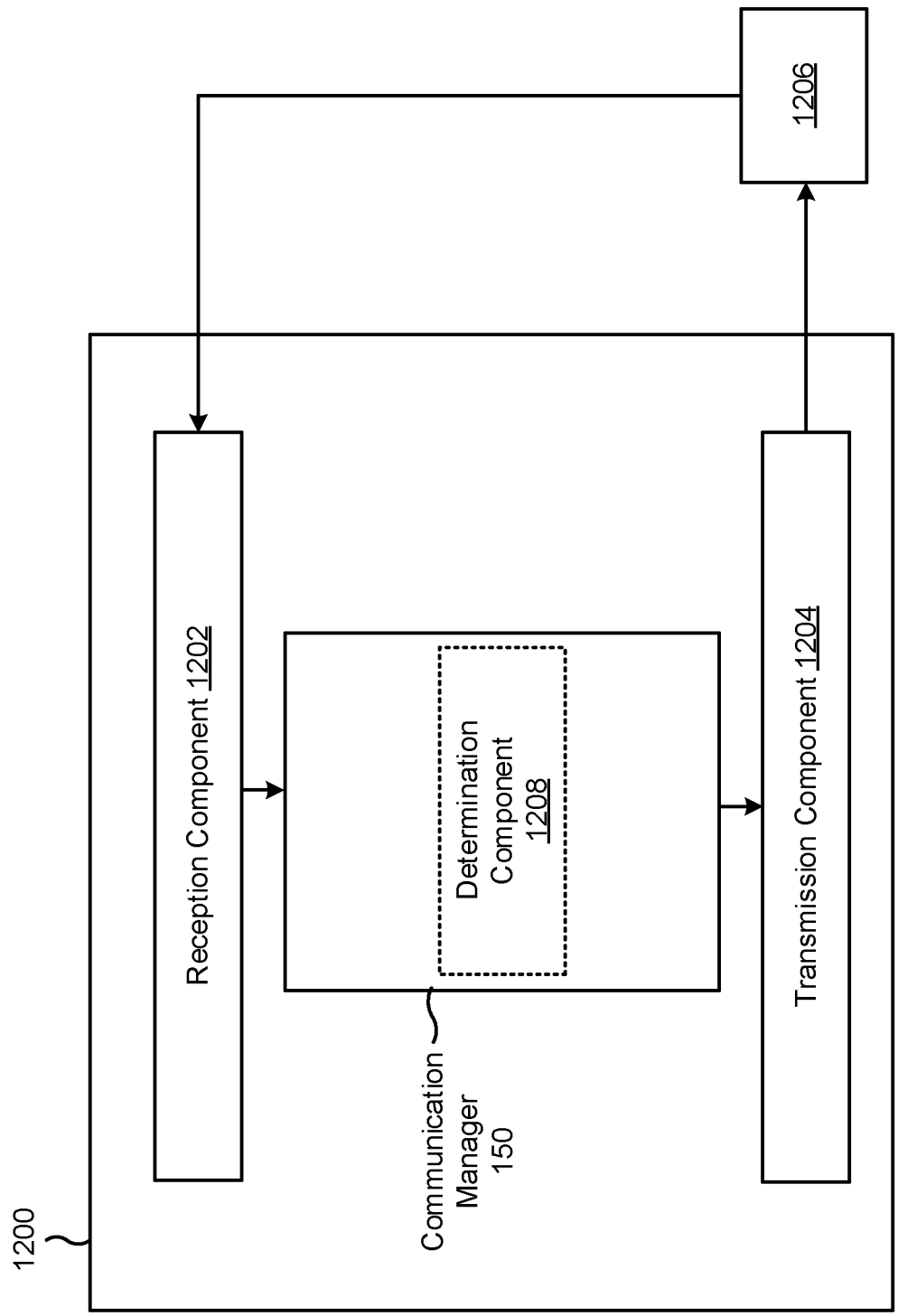

FIG. 12 is a diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include a determination component 1208, among other examples.

In some aspects, the apparatus 1200 may be configured to perform one or more operations described herein in connection with FIGS. 5-6. Additionally, or alternatively, the apparatus 1200 may be configured to perform one or more processes described herein, such as process 800 of FIG. 8, or a combination thereof. In some aspects, the apparatus 1200 and/or one or more components shown in FIG. 12 may include one or more components of the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the base station described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the base station described in connection with FIG. 2. In some aspects, the transmission component 1204 may be co-located with the reception component 1202 in a transceiver.

The transmission component 1204 may transmit, to an RIS, an indication of a first security key associated with the RIS, wherein the first security key is to be added, using a modulation signature, to signals reflected by the RIS. The transmission component 1204 may transmit a first signal that is associated with a downlink control channel, wherein the first signal includes a second security key, and wherein the first signal is to be reflected by the RIS. The transmission component 1204 may transmit a second signal that is associated with a downlink shared channel, wherein the second signal includes a third security key, and wherein the first security key, the second security key, and the third security key enable a UE to authenticate the second signal.

The reception component 1202 may receive, from the UE, a report for a link associated with the RIS, wherein the report indicates at least one of an identifier associated with the RIS and one or more measurements of one or more signals transmitted via the link, and wherein transmitting, to the RIS, the indication of the first security key is based at least in part on the report.

The determination component 1208 may identify a link quality associated with the link based at least in part on the one or more measurements.

The determination component 1208 may determine whether the RIS is to use the first security key when redirecting or reflecting signals to the UE.

The transmission component 1204 may transmit, to the UE, an indication of a fourth security key, wherein at least one of the second security key or the third security key is based at least in part on the fourth security key.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
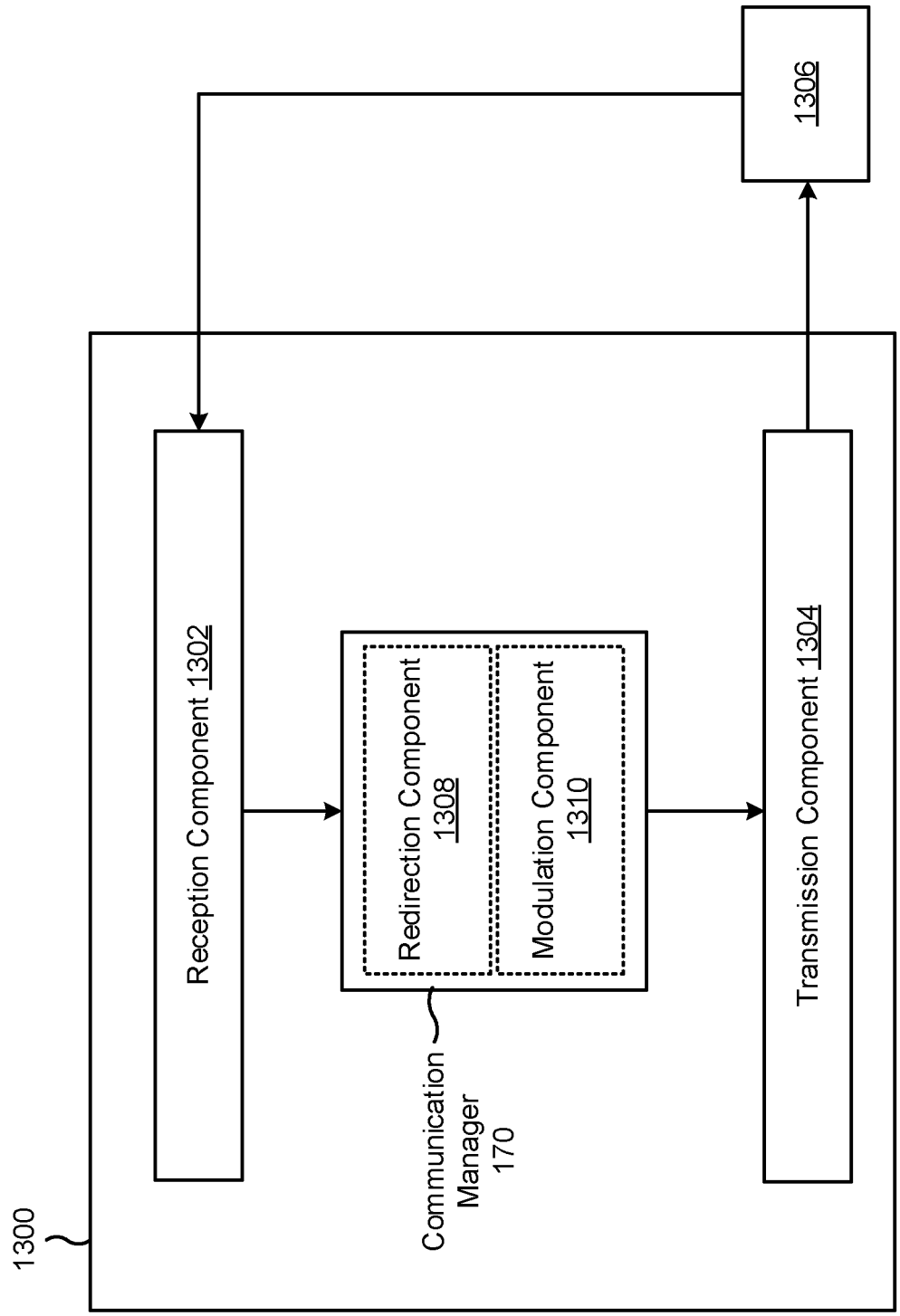

FIG. 13 is a diagram of an example apparatus 1300 for wireless communication. The apparatus 1300 may be an RIS, or an RIS may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 170. The communication manager 170 may include one or more of a redirection component 1308, and/or a modulation component 1310, among other examples.

In some aspects, the apparatus 1300 may be configured to perform one or more operations described herein in connection with FIGS. 5-6. Additionally, or alternatively, the apparatus 1300 may be configured to perform one or more processes described herein, such as process 900 of FIG. 9, or a combination thereof. In some aspects, the apparatus 1300 and/or one or more components shown in FIG. 13 may include one or more components of the RIS described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the RIS described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the RIS described in connection with FIG. 2. In some aspects, the transmission component 1304 may be co-located with the reception component 1302 in a transceiver.

The reception component 1302 may receive, from a base station, an indication of a first security key associated with the RIS, wherein the first security key is to be added, using a modulation signature, to signals reflected by the RIS. The reception component 1302 may receive, from the base station, a first signal associated with a downlink control channel, wherein the first signal includes a second security key. The redirection component 1308 may redirect, to a UE, the first signal by including the modulation signature that identifies the first security key in the first signal. The redirection component 1308 may redirect, to the UE, a second signal, wherein the second signal includes a third security key, and wherein the first security key, the second security key, and the third security key enable the UE to authenticate the second signal.

The modulation component 1310 may modulate the first signal in phase, polarization state, and/or amplitude in accordance with the modulation signature to insert the first security key into the first signal.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving a first signal associated with a downlink control channel, wherein the first signal uses a modulation signature that identifies a first security key associated with a reconfigurable intelligent surface (RIS), and wherein the first signal includes a second security key; and receiving a second signal associated with a downlink shared channel, wherein the second signal includes a third security key, and wherein the second signal is authenticated by the UE based at least in part on the first security key, the second security key, and the third security key.

Aspect 2: The method of Aspect 1, further comprising: decoding the second signal to authenticate the second signal using the first security key, the second security key, and the third security key.

Aspect 3: The method of any of Aspects 1-2, wherein decoding the second signal to authenticate the second signal comprises: generating, using an authentication function, an authentication key based at least in part on the first security key and the second security key; and authenticating the second signal based at least in part on whether the authentication key matches the third security key.

Aspect 4: The method of any of Aspects 1-3, further comprising: transmitting, to a base station, a report for a link associated with the RIS, wherein the report indicates at least one of an identifier associated with the RIS and one or more measurements of one or more signals transmitted via the link, wherein the first signal using the modulation signature that identifies the first security key is based at least in part on the report.

Aspect 5: The method of Aspect 4, further comprising: measuring the one or more signals transmitted via the link using an RIS reference signal associated with the one or more signals to obtain the one or more measurements.

Aspect 6: The method of any of Aspects 4-5, wherein the first signal using the modulation signature that identifies the first security key is based at least in part on the one or more measurements satisfying a threshold.

Aspect 7: The method of any of Aspects 4-6, wherein the report includes an indication of whether the one or more measurements satisfy a threshold, and wherein the first signal using the modulation signature that identifies the first security key is based at least in part on whether the one or more measurements satisfy the threshold.

Aspect 8: The method of any of Aspects 1-7, wherein the modulation signature is at least one of a phase modulation signature, a polarization modulation signature, or an amplitude modulation signature.

Aspect 9: The method of any of Aspects 1-8, wherein the first security key is based at least in part on an identifier associated with the RIS.

Aspect 10: The method of any of Aspects 1-9, wherein the modulation signature further identifies an identifier associated with the RIS.

Aspect 11: The method of any of Aspects 1-10, further comprising: receiving, from a base station, an indication of a fourth security key, wherein at least one of the second security key or the third security key is based at least in part on the fourth security key.

Aspect 12: The method of Aspect 11, wherein receiving the indication of the fourth security key comprises: receiving, from the base station, the indication of the fourth security key as part of a connection establishment procedure with the base station.

Aspect 13: The method of any of Aspects 11-12, wherein the fourth security key is associated with at least one of UE-specific data security or medium access control signaling security.

Aspect 14: The method of any of Aspects 1-13, wherein the first signal using the modulation signature that identifies the first security key is based at least in part on the first signal being associated with a beam state or a spatial direction that is associated with the UE.

Aspect 15: A method of wireless communication performed by a base station, comprising: transmitting, to a reconfigurable intelligent surface (RIS), an indication of a first security key associated with the RIS, wherein the first security key is to be added, using a modulation signature, to signals reflected by the RIS; transmitting a first signal that is associated with a downlink control channel, wherein the first signal includes a second security key, and wherein the first signal is to be reflected by the RIS; and transmitting a second signal that is associated with a downlink shared channel, wherein the second signal includes a third security key, and wherein the first security key, the second security key, and the third security key enable a user equipment (UE) to authenticate the second signal.

Aspect 16: The method of Aspect 15, further comprising: receiving, from the UE, a report for a link associated with the RIS, wherein the report indicates at least one of an identifier associated with the RIS and one or more measurements of one or more signals transmitted via the link, and wherein transmitting, to the RIS, the indication of the first security key is based at least in part on the report.

Aspect 17: The method of Aspect 16, further comprising: identifying a link quality associated with the link based at least in part on the one or more measurements.

Aspect 18: The method of any of Aspects 16-17, wherein transmitting, to the RIS, the indication of the first security key is based at least in part on the one or more measurements satisfying a threshold.

Aspect 19: The method of any of Aspects 16-18, wherein the report includes an indication of whether the one or more measurements satisfy a threshold, and wherein transmitting, to the RIS, the indication of the first security key is based at least in part on whether the one or more measurements satisfy the threshold.

Aspect 20: The method of any of Aspects 15-19, wherein the modulation signature is at least one of a phase modulation signature, a polarization modulation signature, or an amplitude modulation signature.

Aspect 21: The method of any of Aspects 15-20, wherein the first security key is based at least in part on an identifier associated with the RIS.

Aspect 22: The method of any of Aspects 15-21, further comprising: transmitting, to the UE, an indication of a fourth security key, wherein at least one of the second security key or the third security key is based at least in part on the fourth security key.

Aspect 23: The method of Aspect 22, wherein transmitting the indication of the fourth security key comprises: transmitting, to the UE, the indication of the fourth security key as part of a connection establishment procedure with the UE.

Aspect 24: The method of any of Aspects 22-23, wherein the fourth security key is associated with at least one of UE-specific data security or medium access control signaling security.

Aspect 25: The method of any of Aspects 15-24, wherein transmitting, to the RIS, the indication of the first security key comprises: transmitting an indication of a beam state or a spatial direction to which the first security key is to be added by the RIS.

Aspect 26: A method of wireless communication performed by a reconfigurable intelligent surface (RIS), comprising: receiving, from a base station, an indication of a first security key associated with the RIS, wherein the first security key is to be added, using a modulation signature, to signals reflected by the RIS; receiving, from the base station, a first signal associated with a downlink control channel, wherein the first signal includes a second security key; redirecting, to a user equipment (UE), the first signal by including the modulation signature that identifies the first security key in the first signal; and redirecting, to the UE, a second signal, wherein the second signal includes a third security key, and wherein the first security key, the second security key, and the third security key enable the UE to authenticate the second signal.

Aspect 27: The method of Aspect 26, wherein the modulation signature is at least one of a phase modulation signature, a polarization modulation signature, or an amplitude modulation signature.

Aspect 28: The method of any of Aspects 26-27, wherein the modulation signature is a polarization modulation signature, and wherein redirecting the first signal comprises: modulating a polarization state of the first signal from a first polarization state of the first signal as transmitted by the base station to a second polarization state of the first signal, wherein the polarization state includes an angle of polarization or a polarization mode.

Aspect 29: The method of any of Aspects 26-28, wherein the modulation signature identifies the first security key and an identifier associated with the RIS.

Aspect 30: The method of any of Aspects 26-29, wherein the first security key is based at least in part on an identifier associated with the RIS.

Aspect 31: The method of any of Aspects 26-30, wherein at least one of the second security key or the third security key is based at least in part on a fourth security key.

Aspect 32: The method of Aspect 31, wherein the fourth security key is established as part on a connection establishment procedure between the base station and the UE.

Aspect 33: The method of any of Aspects 26-32, wherein redirecting the first signal including the modulation signature is based at least in part on a quality of a link between the RIS and the UE satisfying a threshold.

Aspect 34: The method of any of Aspects 26-33, wherein receiving the indication of the first security key comprises: receiving an indication of a beam state or a spatial direction to which the first security key is to be added by the RIS; and wherein redirecting the first signal by including the modulation signature that identifies the first security key in the first signal is based at least in part on the first signal being redirected using the beam state or the spatial direction.

Aspect 35: An apparatus for wireless communication at a device, comprising a processor; memory coupled with the processor; and instructions stored in the memory and executable by the processor to cause the apparatus to perform the method of one or more of Aspects 1-14.

Aspect 36: A device for wireless communication, comprising a memory and one or more processors coupled to the memory, the one or more processors configured to perform the method of one or more of Aspects 1-14.

Aspect 37: An apparatus for wireless communication, comprising at least one means for performing the method of one or more of Aspects 1-14.

Aspect 38: A non-transitory computer-readable medium storing code for wireless communication, the code comprising instructions executable by a processor to perform the method of one or more of Aspects 1-14.

Aspect 39: A non-transitory computer-readable medium storing a set of instructions for wireless communication, the set of instructions comprising one or more instructions that, when executed by one or more processors of a device, cause the device to perform the method of one or more of Aspects 1-14.

Aspect 40: An apparatus for wireless communication at a device, comprising a processor; memory coupled with the processor; and instructions stored in the memory and executable by the processor to cause the apparatus to perform the method of one or more of Aspects 15-25.

Aspect 41: A device for wireless communication, comprising a memory and one or more processors coupled to the memory, the one or more processors configured to perform the method of one or more of Aspects 15-25.

Aspect 42: An apparatus for wireless communication, comprising at least one means for performing the method of one or more of Aspects 15-25.

Aspect 43: A non-transitory computer-readable medium storing code for wireless communication, the code comprising instructions executable by a processor to perform the method of one or more of Aspects 15-25.

Aspect 44: A non-transitory computer-readable medium storing a set of instructions for wireless communication, the set of instructions comprising one or more instructions that, when executed by one or more processors of a device, cause the device to perform the method of one or more of Aspects 15-25.

Aspect 45: An apparatus for wireless communication at a device, comprising a processor; memory coupled with the processor; and instructions stored in the memory and executable by the processor to cause the apparatus to perform the method of one or more of Aspects 26-34.

Aspect 46: A device for wireless communication, comprising a memory and one or more processors coupled to the memory, the one or more processors configured to perform the method of one or more of Aspects 26-34.

Aspect 47: An apparatus for wireless communication, comprising at least one means for performing the method of one or more of Aspects 26-34.

Aspect 48: A non-transitory computer-readable medium storing code for wireless communication, the code comprising instructions executable by a processor to perform the method of one or more of Aspects 26-34.

Aspect 49: A non-transitory computer-readable medium storing a set of instructions for wireless communication, the set of instructions comprising one or more instructions that, when executed by one or more processors of a device, cause the device to perform the method of one or more of Aspects 26-34.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a first signal associated with a downlink control channel, wherein the first signal uses a modulation signature that identifies a first security key associated with a reconfigurable intelligent surface (RIS), and wherein the first signal includes a second security key; and
   receiving a second signal associated with a downlink shared channel, wherein the second signal includes a third security key, and wherein the second signal is authenticated by the UE based at least in part on the first security key, the second security key, and the third security key.

2. The method of claim 1, further comprising:
   decoding the second signal to authenticate the second signal using the first security key, the second security key, and the third security key.

3. The method of claim 1, wherein decoding the second signal to authenticate the second signal comprises:
   generating, using an authentication function, an authentication key based at least in part on the first security key and the second security key; and
   authenticating the second signal based at least in part on whether the authentication key matches the third security key.

4. The method of claim 1, further comprising:
   transmitting, to a base station, a report for a link associated with the RIS, wherein the report indicates at least one of an identifier associated with the RIS and one or more measurements of one or more signals transmitted via the link, wherein the first signal using the modulation signature that identifies the first security key is based at least in part on the report.

5. The method of claim 4, further comprising:
   measuring the one or more signals transmitted via the link using an RIS reference signal associated with the one or more signals to obtain the one or more measurements.

6. The method of claim 4, wherein the report includes an indication of whether the one or more measurements satisfy a threshold, and wherein the first signal using the modulation signature that identifies the first security key is based at least in part on whether the one or more measurements satisfy the threshold.

7. The method of claim 1, wherein the modulation signature is at least one of a phase modulation signature, a polarization modulation signature, or an amplitude modulation signature.

8. The method of claim 1, further comprising:
   receiving, from a base station, an indication of a fourth security key, wherein at least one of the second security key or the third security key is based at least in part on the fourth security key.

9. The method of claim 8, wherein receiving the indication of the fourth security key comprises:
   receiving, from the base station, the indication of the fourth security key as part of a connection establishment procedure with the base station.

10. The method of claim 1, wherein the first signal using the modulation signature that identifies the first security key is based at least in part on the first signal being associated with a beam state or a spatial direction that is associated with the UE.

11. A method of wireless communication performed by a base station, comprising:
    transmitting, to a reconfigurable intelligent surface (RIS), an indication of a first security key associated with the RIS, wherein the first security key is to be added, using a modulation signature, to signals reflected by the RIS;
    transmitting a first signal that is associated with a downlink control channel, wherein the first signal includes a second security key, and wherein the first signal is to be reflected by the RIS; and
    transmitting a second signal that is associated with a downlink shared channel, wherein the second signal includes a third security key, and wherein the first security key, the second security key, and the third security key enable a user equipment (UE) to authenticate the second signal.

12. The method of claim 11, further comprising:
    receiving, from the UE, a report for a link associated with the RIS, wherein the report indicates at least one of an identifier associated with the RIS and one or more measurements of one or more signals transmitted via the link, and wherein transmitting, to the RIS, the indication of the first security key is based at least in part on the report.

13. The method of claim 12, wherein the report includes an indication of whether the one or more measurements satisfy a threshold, and wherein transmitting, to the RIS, the indication of the first security key is based at least in part on whether the one or more measurements satisfy the threshold.

14. The method of claim 11, wherein the modulation signature is at least one of a phase modulation signature, a polarization modulation signature, or an amplitude modulation signature.

15. The method of claim 11, wherein transmitting, to the RIS, the indication of the first security key comprises:
    transmitting an indication of a beam state or a spatial direction to which the first security key is to be added by the RIS.

16. A user equipment (UE) for wireless communication, comprising:
a memory; and
one or more processors, coupled to the memory, configured to:
receive a first signal associated with a downlink control channel, wherein the first signal uses a modulation signature that identifies a first security key associated with a reconfigurable intelligent surface (RIS), and wherein the first signal includes a second security key; and
receive a second signal associated with a downlink shared channel,
wherein the second signal includes a third security key, and wherein the second signal is authenticated by the UE based at least in part on the first security key, the second security key, and the third security key.

17. The UE of claim 16, wherein the one or more processors are further configured to:
decode the second signal to authenticate the second signal using the first security key, the second security key, and the third security key.

18. The UE of claim 16, wherein the one or more processors, to decode the second signal to authenticate the second signal, are configured to:
generate, using an authentication function, an authentication key based at least in part on the first security key and the second security key; and
authenticate the second signal based at least in part on whether the authentication key matches the third security key.

19. The UE of claim 16, wherein the one or more processors are further configured to:
transmit, to a base station, a report for a link associated with the RIS, wherein the report indicates at least one of an identifier associated with the RIS and one or more measurements of one or more signals transmitted via the link, wherein the first signal using the modulation signature that identifies the first security key is based at least in part on the report.

20. The UE of claim 19, wherein the one or more processors are further configured to:
measure the one or more signals transmitted via the link using an RIS reference signal associated with the one or more signals to obtain the one or more measurements.

21. The UE of claim 19, wherein the report includes an indication of whether the one or more measurements satisfy a threshold, and wherein the first signal using the modulation signature that identifies the first security key is based at least in part on whether the one or more measurements satisfy the threshold.

22. The UE of claim 16, wherein the modulation signature is at least one of a phase modulation signature, a polarization modulation signature, or an amplitude modulation signature.

23. The UE of claim 16, wherein the one or more processors are further configured to:
receive, from a base station, an indication of a fourth security key, wherein at least one of the second security key or the third security key is based at least in part on the fourth security key.

24. The UE of claim 23, wherein the one or more processors, to receive the indication of the fourth security key, are configured to:
receive, from the base station, the indication of the fourth security key as part of a connection establishment procedure with the base station.

25. The UE of claim 16, wherein the first signal using the modulation signature that identifies the first security key is based at least in part on the first signal being associated with a beam state or a spatial direction that is associated with the UE.

26. A base station for wireless communication, comprising:
a memory; and
one or more processors, coupled to the memory, configured to:
transmit, to a reconfigurable intelligent surface (RIS), an indication of a first security key associated with the RIS, wherein the first security key is to be added, using a modulation signature, to signals reflected by the RIS;
transmit a first signal that is associated with a downlink control channel, wherein the first signal includes a second security key, and wherein the first signal is to be reflected by the RIS; and
transmit a second signal that is associated with a downlink shared channel, wherein the second signal includes a third security key, and wherein the first security key, the second security key, and the third security key enable a user equipment (UE) to authenticate the second signal.

27. The base station of claim 26, wherein the one or more processors are further configured to:
receive, from the UE, a report for a link associated with the RIS, wherein the report indicates at least one of an identifier associated with the RIS and one or more measurements of one or more signals transmitted via the link, and wherein transmitting, to the RIS, the indication of the first security key is based at least in part on the report.

28. The base station of claim 27, wherein the report includes an indication of whether the one or more measurements satisfy a threshold, and wherein transmitting, to the RIS, the indication of the first security key is based at least in part on whether the one or more measurements satisfy the threshold.

29. The base station of claim 26, wherein the modulation signature is at least one of a phase modulation signature, a polarization modulation signature, or an amplitude modulation signature.

30. The base station of claim 26, wherein the one or more processors, to transmit, to the RIS, the indication of the first security key, are configured to:
transmit an indication of a beam state or a spatial direction to which the first security key is to be added by the RIS.

* * * * *